US012463823B2

(12) United States Patent
Fournier et al.

(10) Patent No.: US 12,463,823 B2
(45) Date of Patent: Nov. 4, 2025

(54) SYSTEMS AND METHODS FOR DIGITALLY SIGNED CONTRACTS WITH VERIFIABLE CREDENTIALS

(71) Applicant: Portable Data Corp, Oakland, CA (US)

(72) Inventors: James Fournier, Nicasio, CA (US); Victor Grey, Concord, CA (US)

(73) Assignee: PORTABLE DATA CORPORATION, Oakland, CA (US)

( * ) Notice: Subject to any disclaimer, the term of this patent is extended or adjusted under 35 U.S.C. 154(b) by 304 days.

(21) Appl. No.: 18/073,210

(22) Filed: Dec. 1, 2022

(65) Prior Publication Data

US 2023/0095123 A1    Mar. 30, 2023

Related U.S. Application Data

(63) Continuation-in-part of application No. 14/681,953, filed on Apr. 8, 2015, now abandoned, and a
(Continued)

(51) Int. Cl.
*H04L 9/32* (2006.01)
*H04L 9/08* (2006.01)

(52) U.S. Cl.
CPC .......... *H04L 9/3247* (2013.01); *H04L 9/0825* (2013.01); *H04L 9/3236* (2013.01); *H04L 2209/56* (2013.01)

(58) Field of Classification Search
CPC .... H04L 9/3247; H04L 9/0825; H04L 9/3236
See application file for complete search history.

(56) References Cited

U.S. PATENT DOCUMENTS

| 8,228,299 B1 * | 7/2012 | Maloney ................. G06Q 20/10 345/173 |
| 2003/0177356 A1 * | 9/2003 | Abela ................. G06Q 20/3821 713/168 |

(Continued)

FOREIGN PATENT DOCUMENTS

| WO | 2017147692 | 9/2017 |
| WO | 2019070419 | 4/2019 |

OTHER PUBLICATIONS

Sotos, J. et al., Blockchains for Data Sharing in Clinical Research: Trust in a Trustless World, Intel, Santa Clara, CA, USA, Blockchain Application Note #1, published May 2017 < URL: https://simplecore.intel.com/itpeernetwork/wp-content/uploads/sites/38/2017/05/Intel_Blockchain_Application_Note1.pdf > [2].

(Continued)

*Primary Examiner* — Scott C Anderson
(74) *Attorney, Agent, or Firm* — David R. Stevens; Stevens Law Group

(57) ABSTRACT

A method for seamlessly and automatically granting tailored permission for use and transference of internet data between databases with comprehensive consent is described. The method employs a graph language such as JSON-LD to integrate and employ cryptographically signed Information Sharing Agreements (ISAs) between parties. Data is serialized to be easily transferred between databases when appropriate permission is obtained. Granular data exchange under usage control contacts can be automated among any number of parties on the internet. As such, the method provides a means by which users may control not only what may be done with their data, but to what entity or entities the data may be transferred. Advertisements may then be served to the user according to his or her preferences as defined within (Continued)

a web or desktop app, which is then applied to all related ad publishers publishing to the domains visited by the user.

27 Claims, 13 Drawing Sheets

Related U.S. Application Data continuation-in-part of application No. 16/900,971, filed on Jun. 14, 2020, now Pat. No. 11,556,959, which is a continuation-in-part of application No. 16/772,793, filed as application No. PCT/US2018/052089 on Sep. 20, 2018, now Pat. No. 11,727,414.

(60) Provisional application No. 62/560,714, filed on Sep. 20, 2017, provisional application No. 62/589,334, filed on Nov. 21, 2017.

(56) References Cited

U.S. PATENT DOCUMENTS

| | | | |
|---|---|---|---|
| 2005/0182773 A1 | 8/2005 | Feinsmith | |
| 2007/0077981 A1* | 4/2007 | Hungate | G06Q 20/20 463/16 |
| 2010/0237151 A1* | 9/2010 | Bosselaers | G07C 13/00 235/487 |
| 2012/0290427 A1 | 11/2012 | Reed et al. | |
| 2013/0041755 A1 | 2/2013 | Ivanov et al. | |
| 2013/0046582 A1* | 2/2013 | Ramer | G06Q 10/101 705/7.32 |
| 2013/0132547 A1* | 5/2013 | Reed | H04L 41/00 709/223 |
| 2013/0246199 A1* | 9/2013 | Carlson | G06Q 20/405 705/16 |
| 2014/0020082 A1* | 1/2014 | Leggette | G06F 3/0647 726/10 |
| 2014/0279526 A1* | 9/2014 | Jackson | G06Q 20/405 705/44 |
| 2014/0316940 A1* | 10/2014 | Kirchenbauer | G06Q 30/0609 705/26.35 |
| 2014/0370879 A1 | 12/2014 | Redding et al. | |
| 2014/0373133 A1* | 12/2014 | Foresti | G06F 16/337 726/19 |
| 2015/0134552 A1* | 5/2015 | Engels | G06Q 10/087 705/318 |
| 2016/0300223 A1 | 10/2016 | Grey et al. | |
| 2019/0188701 A1 | 6/2019 | Parsons et al. | |
| 2020/0058023 A1 | 2/2020 | Travizano et al. | |
| 2020/0084051 A1 | 3/2020 | Bessonov et al. | |

OTHER PUBLICATIONS

Arenas, A. E., "An Event-B approach to Data Sharing Agreements", 8th International Conference on Integrated Formal Methods (IFM 2010), Nancy, France, published 2010 < URL: https://epubs.stfc.ac.uk/manifestation/48912666/STFC-AAM-2021-008.pdf > [2].

Matteucci, I. et al., "CNL4DSA: a controlled natural language for data sharing agreements", Proceedings of the 2010 ACM Symposium on Applied Computing, published 2010 < URL: https://www.researchgate.net/profile/Marco-Sbodio/publication/221001628_CNL4DSA_A_controlled_natural_language_for_data_sharing_agreements/links/0912f50a3602c606dd000000/CNL4DSA-A-controlled-natural-language-for-data-sharing-agreements.pdf > [2].

"KERI: For every DID, a microledger," published Oct. 19, 2020 by Decentralized Identity Foundation, available online at https://medium.com/decentralized-identity/keri-for-every-did-a-microledger-f9457fa80d2d, retrieved and last visited Jun. 17, 2024.

"Microledger, its importance in the world of crypto," published Apr. 20, 2022, available online at https://www.coingabbar.com/en/crypto-blogs-details/microledger-its-importance-in-the-world-of-crypto, retrieved and last visited Jun. 17, 2024.

"Decentralized Identifiers (DIDs) v1.0: Core architecture, data model, and representations," published online by W3C Jul. 19, 2022, available online at https://www.w3.org/TR/vc-data-model/, retrieved and last visited Jun. 19, 2024.

JLINC Protocol Summary, published online by applicant at least as early as 2018, available online at https://jlinc.org/, retrieved and last visited Jun. 19, 2024.

Detailed JLINC Protocol, published online by applicant at least as early as Mar. 26, 2020, available online at https://protocol.jlinc.org/, retrieved and last visited Jun. 19, 2024.

JLINC Schema, published online by applicant at least as early as Feb. 12, 2019, available online at https://protocol.jlinc.org/schema/, retrieved and last visited Jun. 19, 2024.

Jlinc Did Method Specification, published online by applicant at least as early as Oct. 12, 2018, available online at https://did-spec.jlinc.org/, retrieved and last visited Jun. 19, 2024.

"Verifiable Credentials Data Model v1.1," published online by W3C at least as early as Mar. 3, 2022, available online at https://www.w3.org/TR/vc-data-model/, retrieved and last visited Jun. 19, 2024.

"My first impressions of web3," published online at least as early as Jan. 7, 2022, available online at https://moxie.org/2022/01/07/web3-first-impressions.html, retrieved and last visited Jun. 19, 2024.

"Hash Function," Published online by Wikipedia at least as early as May 30, 2020, available online at https://en.wikipedia.org/w/index.php?title=Hash_function&oldid=959841170, retrieved and last visited Jun. 16, 2022.

* cited by examiner

SYSTEMS AND METHODS FOR DIGITALLY SIGNED CONTRACTS WITH VERIFIABLE CREDENTIALS

CROSS REFERENCE TO RELATED APPLICATIONS

This document is a continuation-in-part of U.S. Nonprovisional Utility patent application Ser. No. 14/681,953, entitled "Protected Data Transfer Across Disparate Networks," naming as first inventor Victor Grey, which was filed on Apr. 8, 2015, the disclosure of which is hereby incorporated entirely herein by reference.

This document is also a continuation-in-part of U.S. Nonprovisional Utility patent application Ser. No. 16/900,971, entitled "Internet Data Usage Control System," naming as first inventor James Fournier, which was filed on Jun. 14, 2020, which in turn is a continuation-in-part application of U.S. Nonprovisional Utility patent application Ser. No. 16/772,793, entitled "Internet Data Usage Control System," naming as first inventor James Fournier, which was filed on Jun. 14, 2020, which in turn is a U.S. National Stage Entry of Patent Cooperation Treaty Application PCT/US18/52089, entitled "Internet Data Usage Control System," naming as first inventor Victor Grey, which was filed on Sep. 20, 2018 (the '089 PCT application), which '089 PCT application claims priority from U.S. Provisional Utility Patent Application Ser. No. 62/560,714, entitled "Internet Data Usage Control System," naming as first inventor James Fournier, which was filed on Sep. 20, 2017, and which '089 PCT application also claims priority from U.S. Provisional Utility Patent Application Ser. No. 62/589,334, entitled "Internet Data Usage Control System," naming as first inventor James Fournier, which was filed on Nov. 21, 2017, the disclosures of each of which are hereby incorporated entirely herein by reference.

BACKGROUND

1. Technical Field

The present disclosure relates generally to digital data transfer, and more particularly to protected digital data portability across multiple disparate networks and servers. The present disclosure also relates to Internet data, and more specifically relates to permissioned data exchange among parties over the internet.

2. Background Art

Data sharing and transfers via networks are ubiquitous in our modem computerized society. Many individuals, groups, companies, organizations, and the like routinely not only share digital data about themselves and things that they know, but also search for data and information about other parties and other things across closed networks, multiple networks, and the Internet. In general, data portability refers to the possibility for a user to have its data moved from one data host to another. Such a user can be an individual, company, or other party, and the user data can be moved by the user itself, or the user can grant permission to another party or entity to move or receive the data or ongoing currently updated copies of the data, such as by a link. Such data hosts can be on a single network, or can be across disparate networks and even the Internet in general. Such data can include data that has been self-created and/or data that has been created about the user as a result of its activities or other information storage.

Data portability can be important with respect to a user, a vendor, and/or another party wishing to obtain or exchange identifying or other pertinent information, such as for a potential purchase or other commercial transaction/exchange. Of course, there can be many drawbacks to the unlimited availability and exchange of identifying or other personal information, and few people are willing to provide their own personal data in a wide open and unrestricted manner. There are almost always requirements, restrictions, or other protections that go along with providing such personal data, as is generally well known.

While the exchange of identifying or other personal data can often be kept under control or restricted when it takes place within a single controlled network or domain, it can be problematic to provide for data portability across multiple disparate servers, networks, or the Internet in general. For example, where a user might wish to obtain information about a particular product, he or she might provide his or her personal information or data on a proprietary website or single network of a known vendor for that type of product, where it might be reasonably expected that such information can be kept safe or protected by a reputable operator of the single website or network. Constantly and repeatedly providing personal information or data can be cumbersome and inefficient though, such as where a user might wish to provide and/or access data from multiple providers, networks, or sites.

In fact, it has become increasingly common simply to provide personal data over the Internet in general, sometimes in ways that are not well secured or protected. The Internet has become the common network connecting many other types of digital networks and devices for communications and data interchange. The increased use of the Internet has led to an increase in the number of applications and services running thereon, the number and value of transactions taking place, and the number and types of relationships that can be formed and maintained electronically. Each of these has in turn increased the importance of trust in online activities. Although a number of known technologies and services have been developed to meet this need, there tends to be drawbacks or limitations to each of that which is currently known.

For example, peer-to-peer reputation systems can be scalable, efficient, and do not require central trust authorities. Such systems, however, can be unduly complex, have not been robustly implemented, and can be vulnerable to outside attacks, particularly when the systems are distributed across multiple networks. Customer based networks can provide customer service and product feedback services across a large number of businesses, but these tend to be single networks. As such, they typically require every user to join in order to interact and build a large, trusted community for that network. This also requires a user to create separate profiles and build up the corresponding reputations separately on each different profile and platform, which reputations typically are not transferable from one site or network to another.

Other types of systems or services similarly provide users and vendors with the ability to exchange protected information or data in a reasonably secure or protected manner. For example, banking and credit networks, as well as healthcare networks, also have items and functions in place that serve to protect user information. As in the case of other systems, however, these also tend to involve proprietary or single networks, such that data portability across multiple disparate networks is just not possible for these data sets.

When a given data sharing or portability system might be available across multiple networks, a user typically has little to no control over its own data once that data is released into the system. This can be problematic where the use of some sensitive data is necessary for the system to work, as few users will be willing to sign on to such an unprotected system.

While various systems and techniques for providing data portability have generally been adequate in the past, there is always a desire for improvement. To that end, it would be desirable to have improved data portability systems and techniques that are adapted for implementation across multiple disparate networks, and in particular for such systems and techniques to be more secure or protecting of the data of their users.

Additionally, presently, there is no automated way to control the use of data after it has been transmitted from one computing device to another computing device, or from one database to another database, using the Internet or other network. There is presently no automated way to verify the chain of custody, or provenance, for data received using the Internet. Additionally, there is presently no protocol available which reconciles and harmonizes the REVISED PAYMENT SERVICES DIRECTIVE (PSD2) and the GENERAL DATA PROTECTION REGULATION (GDPR).

Thus, there is a need for a new system and method by which an entity's data may be controlled, and use of the data may be restricted by the originator of the data securely and automatically according to preferences established by the entity. Additionally, there is a need for a methodized system which employs cryptographically signed, automated agreements between parties, users, or entities for the use and transference of data with full transparency. Such a system provides for a clear chain-of-custody of one's internet data, and enables users to restrict certain forms of usage and/or transference/sharing. The system is preferably configured to define and describe data so as to facilitate the movement of data from one database to another easily. The system and method preferably employ an existing graph language and existing PUBLIC KEY INFRASTRUCTURE (PKI) public/private key pairs. Additionally, such a system is preferably architected with a separation of concerns—i.e. roles and points on the system have been separated, which then interact with each other—rather than placing everything within a single server or hub such as a walled garden.

At least one previous attempt at creating a graph based user-controlled internet data exchange system has been unsuccessful. XDI aspired to provide built-in data access control via a data graph. However, the effort never achieved a working solution to that objective. XDI was at once over-determined, inefficient, and cumbersome as a graph language, and ultimately failed to work because it was not database friendly. Data could not easily be defined so as to facilitate transfer between databases. EXTENSIBLE DATA INTERCHANGE (XDI) named but never functionally defined a "link contract" in a meaningful way for developers. In contrast to XDI, the present invention currently employs JAVASCRIPT OBJECT NOTATION FOR LINKED DATA (JSON-LD) as an underlying graph language and then goes on to actually define, create and manage link contracts. This allows the present inventions to facilitate data usage control by users with respect to the data that they share, and to govern how, where, and for what purposes, that obtained data may be used by a recipient via user-defined and mutually agreed permissions.

Additionally, there is a need for a system and protocol that is compatible and compliant with both GDPR and PSD2. The spirit of the European Union (EU) GDPR is to empower end-users in their relations with corporations. A working title for new protocols, systems, and methods disclosed herein to accomplish this and other ends is JLINC, which represents a JSON-LD Link Contract. The JLINC protocol takes the spirit of the GDPR literally, placing the data subject (the data rights holder) at the center of every data event. As Lawrence Lessig has stated, "code is law" and the JLINC protocol of the present invention embodies the spirit of the GDPR in the structure of the protocol.

Another European regulation, the PAYMENT SERVICES DIRECTIVE 2 (PSD2) requires banks to make it easier for financial services to access customer's banking services. This might seem to be in contradiction to the GDPR regulations, but it is believed that by placing the data rights holder at the center of each data event, the system of the present invention makes it possible to satisfy the intent and the text of both regulations.

The present invention builds on previous ideas including capability-based security, especially the work of computer scientist Mark Miller, an influential article entitled "The Strength of Weak Ties" by sociologist Mark Granovetter, the "Augmented Social Network" whitepaper from a group of two dozen professionals in the fields of digital communications, environmental activism, independent media, and socially responsible investment, and "Chain-Link Confidentiality" by professor of law and computer science Woodrow Hartzog.

Granovetter pointed out that a social network consisting only of strong ties is an isolated network. Nobody can be introduced to a new connection since everyone likely already knows everyone else. It is the weak ties—acquaintances or people who have met in passing—who provide bridges between social networks, making introductions for people who otherwise would not have met.

Miller and his co-authors saw this as a way to explain some of the power of capability-based computer systems. Miller says that "In a capability system, only connectivity begets connectivity. In a capability system, an object's authority to affect the world outside itself is determined solely by what references it holds, since the only way the object can cause an external effect is to send a message via one of these references. Consequently, the mechanics of reference-passing determine how authority can change over time." He illustrated this with something he called a "Granovetter operator."

In FIG. 12, a diagram from Miller, the foo arrow is a "Granovetter operator" transmitting a capability from Alice to Bob giving him access to Carol. This illustrates connectivity begetting connectivity, as Alice transmits some subset of her ability to connect to Carol over to Bob.

Some of the advantages of such a system are that the capability transferred can be as granular as desired, and that no overarching system of identity is required. It is enough that Alice knows both Bob and Carol and no central authority need be invoked.

Another aspect of capability systems is that because capabilities can carry purpose information, they can enable "least authority" systems, in which only the minimum necessary information for a given purpose is released. Again from Miller, "Capability systems provide support for the precise, minimal, and meaningful delegation of authority, which is fundamental to secure operation."

A major influence on the thinking that went into JLINC was the "Augmented Social Network" (ASN) whitepaper.

The ASN embodied and extended the idealism that inspired the originators of the internet decades previously. It talked about interoperability between communities, brokered relationships, and the transitive nature of trust. Nevertheless, it was still decades ahead of its time as far as the realization of its vision was concerned. JLINC makes important steps in that realization.

Finally, there's chain-link confidentiality. Although in fact JLINC had been in development for several years before the inventors became aware of Professor Hartzog's work, his paper "Chain-Link Confidentiality" published in the Georgia Law Review in 2012 lays out the social and legal theory underlying JLINC, which the inventors had correctly intuited. JLINC can be understood as the technical invention that makes the implementation of chain-link confidentiality possible.

"Chain-Link Confidentiality" states the problem as "Generally, individuals lose control of their personal information once they disclose it on the Internet." And the solution, in essence, is stated as "A chain-link confidentiality regime would contractually link the disclosure of personal information to obligations to protect that information as it is disclosed downstream."

The paper makes the point that contractual confidentiality agreements are a stronger legal framework than the more nebulous notion of "privacy," as they create a fiduciary relationship between the originator of information and the downstream recipients. And further, that those agreements can be constructed so as to obligate a recipient to assure that any subsequent recipients become parties to the same agreement before any data is transmitted.

This is exactly what the JLINC protocol means by a "Standard Information Sharing Agreement" or SISA. JLINC is the means whereby parties can agree to a SISA in an accountable, auditable, non-repudiable, cryptographically secure fashion, and subsequently have an ongoing exchange of information in the context of the agreed SISA, in the same accountable, auditable, non-repudiable, cryptographically secure fashion.

There is a problem. Capability systems were originally conceived as running in the context of a computer operating system whose code enforced the rules, or in a closely networked system all operating under the same coding paradigm. As Lawrence Lessig has stated, "code is law," meaning that however the code in a computer system is constructed determines what is possible or not possible in that system. He is using "law" in the sense of a law of physics rather than law in the legal sense.

Attempts to organize transactions using so called "smart contracts" have been tried, creating a contract as self-executing code. The problem here is that for practical purposes all code contains bugs. The action that the contract executes may, in some unforeseen circumstance, be very much not what the parties to the contract understood would happen. Correction and/or recourse may be problematic since the contract execution is self-evidently in accordance with the contract as coded, as well as irrevocable. One of the first large scale attempts at implementing a "smart contract" resulted in the loss of tens of millions of dollars for exactly this reason.

Attempting to create a capability system between entities over the unregulated public internet poses a problem, because once information is transmitted (i.e. copied) over the internet, the receiving entity is in possession of their copy of it under the control of their own system, and the sender has lost control over the information's usage by the receiver. Access control at the source of the information is in this sense futile—access can be denied but once it is granted all further control is lost.

Systems have been created to overcome the access problem by restricting the amount or nature of information accessible to that which the parties can agree is absolutely necessary, and no more. The most rigorous of these systems, known as zero-knowledge proofs, are mathematical methods used to verify things without sharing or revealing underlying data. For example, that you have enough money in your bank account to complete a transaction without revealing anything else about your balance.

This is not terribly useful however, when two or more parties wish to create an ongoing data stream between themselves containing many types of data (some of it unstructured or of an initially unforeseen nature) but still maintain a fiduciary control over its use. In other words, a confidential conversation.

SUMMARY

This Summary is provided to introduce a selection of concepts in a simplified form that are further described below in the Description. This Summary is not intended to identify key features or essential features of the claimed subject matter, nor is it intended to be used to limit the scope of the claimed subject matter.

It is an advantage of the present disclosure to provide improved systems, methods, and techniques for transferring electronic data across multiple disparate servers and/or networks in a more protected manner. In particular, the improved systems and methods can allow users to set the terms for access controls and permissions to certain portions of their data according to automated rules prior to transferring the data. This can be accomplished at least in part by providing a specific data portability protocol that can be implemented on different servers that are distributed across disparate and unrelated servers or networks, such as over the Internet. In particular, the specialized protocol or portions thereof can reside on one or more link contract servers, and possibly also a plurality of public key identity servers, which can all communicate with each other. This collection of link contract server(s) and public key identity servers can operate collectively to verify user identities and to provide link contracts specifying terms of use for the electronic data prior to transferring the data.

In various embodiments of the present disclosure, an electronic marketplace system adapted to facilitate protected data transfers across disparate servers or networks can include one or more communication devices that are adapted to facilitate digital communications to system users, as well as one or more link contract servers that can be coupled thereto and to a plurality of separate public key identity servers. The one or more link contract servers can be adapted to provide a link contract to a requesting user and a responding user based upon preferences of either or both parties. The link contract server(s) can also be adapted to provide a protected data transfer between the requesting user and the responding user after both of the requesting user and the responding user have agreed to the link contract, such as by digitally signing the contract. The plurality of separate public key identity servers can be coupled to each other, can reside on separate and disparate servers or networks, and can collectively contain a global last-closed ledger of public encryption keys for users of said electronic marketplace system. Each of the separate public key identity servers can be adapted to verify, using the public encryption keys, the identities of the requesting user and the responding user as part of the protected data transfer.

In various detailed embodiments, the link contract can be communicated in an open standard format using human-readable text, such as, for example, JAVASCRIPT OBJECT NOTATION (JSON). In addition, the link contract can be communicated by HYPERTEXT TRANSFER PROTOCOL (HTTP) or HTTP Secure (HTTPS), and may be contained in an HTTP or HTTPS header. Also, the plurality of public key identity servers can form a mesh network, and the protected data transfer can include personal data or other protected data regarding the responding user, the requesting user, or both. The link contract can include terms that restrict data usage, such as terms that restrict the requesting user as to the specific use of personal data regarding the responding user, for example. In various embodiments, a portion of a link contract can point to one or more third party locations that contain standard contract terms, contract portions, or entire contracts. Furthermore, the overall system can be adapted to provide searching, such as to be able to accept an inquiry from a user and provide that inquiry to other users of the system in a manner that is searchable with respect to other user inquiries. In addition, the system can be adapted to provide link contract escrow services regarding the link contract.

The system can also be adapted to provide an index or various pointers to link contracts that are available on link contract servers or elsewhere, which can be done by content type, such as for personal data, and/or for particular music, video, or other media content for download under specific terms. In various embodiments, the system can also include one or more link contract index server portions, where such one or more link contract server portions can have links to contracts that are similar or concern similar data. In these or other embodiments, at least a portion of the link contract can point to one or more link contract index server portions or third party locations that contain standard contract terms, contract portions, or entire contracts. Also, the plurality of separate public key identity servers may or may not be included as part of the electronic marketplace system in various embodiments.

In various further embodiments of the present disclosure, one or more methods of protecting a data transfer between a user and a vendor on a system distributed across disparate servers or networks are provided. Such methods can include a variety of process steps, such as, for example, accepting an inquiry from a user, providing the user inquiry to a vendor, verifying the identities of the user and vendor, permitting either party to propose a link contract, accepting digital signatures from the user and vendor, and transferring the data. One, some, or all of these process steps can be automated, can include the use of a specific protocol, and can be performed over separate and disparate servers or networks.

The user inquiry can be accepted at a link contract server, and can reflect interest regarding information for one or more products or services. The user inquiry can be provided to a vendor from the link contract server, wherein the vendor is able to provide one or more products or services relevant to the user inquiry. Identity verification can be performed by using a public encryption key for the vendor at a first public key identity server selected from a plurality of public key identity servers, and for the user by using a public encryption key for the user at the first public key identity server or a separate second public key identity server. The plurality of public key identity servers can collectively contain a global last-closed ledger of public encryption keys for system users, and can all be in communication with each other. The link contract can contain one or more terms regarding the specific use of the data that is to be transferred, and the digital signatures can indicate agreement by the signing parties with the terms of the link contract regarding the use of the data. The data can be transferred between the user and the vendor via the link contract server after the digital signatures have been accepted.

In various detailed embodiments, which can include the same or similar items or features from any of the foregoing embodiments, the link contract can be communicated between the user and the vendor in JSON, which can be done via an HTTP or HTTPS header. The data transfer can include personal data or other protected data regarding the user, and the link contract can include terms that restrict the vendor as to the specific use of the personal or other protected data regarding the user. Additional process steps can include, for example, creating a unique cryptographic hash of the link contract that is signed with or includes digital signatures of both the user and the vendor using their respective private keys, as well as providing a copy of the unique cryptographic hash and the digital signatures to both the user and the vendor as proof of the agreed upon link contract. Another process step can be allowing the vendor to search through a plurality of inquiries on the system, wherein the plurality of inquiries includes the user inquiry. Still further process steps can include searching the local ledger of public encryption keys for the public encryption key of the vendor at the first public key identity server, and then contacting one or more other servers from the plurality of public key identity servers for the public encryption key of the vendor in the event that the vendor key is not on the local ledger.

In still further embodiments, a computer readable medium including at least computer program code for protecting a data transfer between a user and a vendor on a system distributed across disparate systems and/or networks can include various portions of computer program code. This can include computer program code for accepting an inquiry from a user at a link contract server, computer program code for providing the user inquiry to a vendor from the link contract server, computer program code for verifying the identities of the vendor and user by using public encryption keys, computer program code for permitting either the user or the vendor to propose a link contract to the other, computer program code for accepting digital signatures from both of the user and the vendor, and computer program code for transferring the data between the user and the vendor. Again, some or all of the foregoing details and features may similarly apply to that which is contained in the various portions of computer code. For example, the user inquiry can reflect an interest regarding information for one or more products or services, and the vendor can be able to provide the one or more products or services of interest.

Verifying identifications can be by way of using a public encryption key at one or more public key identity servers selected from a plurality of public key identity servers that collectively contain a global last-closed ledger of public encryption keys for system users, and the link contract server and the public key identity servers may all be in communication with each other. Either party can propose a link contract to the other from the link contract server in order to facilitate a data transfer between the user and the vendor. The link contract can contain one or more terms regarding the specific use of the data that is to be transferred. Digital signatures can indicate agreement with the terms of the link contract regarding the use of the data, and can be accepted at the link contract server. Also, the data can be transferred via the link contract server after the digital signatures have been accepted.

In various detailed embodiments, the data transfer can include personal data or other protected data regarding the user, and the link contract may include terms that restrict the vendor as to the specific use of the personal data or other protected data regarding the user. Also, the computer code can include code for creating a unique cryptographic hash of the link contract that is signed with or includes digital signatures of both the user and the vendor using their respective private keys, as well as code for providing a copy of the unique cryptographic hash and digital signatures to both the user and the vendor as proof of the agreed upon link contract. The computer program code can also include code for allowing the vendor to search through a plurality of inquiries on the system, wherein the plurality of inquiries includes the user inquiry.

Additionally, the present invention includes a method and system for establishing cryptographically signed agreements about data-use permission and data ownership between computing devices across the Internet. The agreement selection, signing and exchange may also be automated. Additionally, the present invention includes a method for allowing two, or more, entities to exchange data in a manner that allows all parties to cryptographically sign agreed terms using the Internet or some other decentralized network for transport. The present invention uses a novel combination of existing standard protocols and methods to achieve the new objective of creating a decentralized data usage permission control mechanism.

The present invention provides a system and method by which users can not only control which entities may obtain their data when their data is desired by one or more entities, but also control what the entities are permitted do with that data after it has been transmitted or collected. The system involves a mutual signing of Information Sharing Agreements (ISAs), which are conventionally cryptographically signed. The contractual signing of the ISAs is facilitated via a robust, automated system primarily enacted using a graph language, such as JSON-LD. The agreements are legally valid and are configured to strongly encourage entities to respect the agreements or face reputation damage and/or legal ramifications.

The system is based on exchanging these ISAs, and the software facilitating the system of the present invention enables users to securely and confidently share data only after the permission and rights to use the data are negotiated and decided.

Most point-to-point data sharing on the internet is done with some form of access control. Administrators control whether or not users may achieve access, or whether data may be exchanged. Currently, when data is exchanged, such as metadata, personal information, browsing information, and similar user data, possession is nine tenths of the law. Once an entity has a user's internet data, he or she may do whatever they wish with it according to typical current terms of service. This is unfortunate for many common users of the internet, who do not know that their data is being captured and have no way of knowing what will be done with it or who it will be shared with. Once an entity has a user's data, they can do what they wish with it.

Today, graph languages such as JSON-LD make it far easier to move data between databases. The current invention adds agreements about how the data may be used, combined, and how such activity may be automated, all in a way that can be cryptographically signed. This has a helpful side effect of helping to move data around between disparate data sources, as it is a common language and form in which to store the data. The system helps to prove what is done with the data, and at what date and time, thereby establishing data provenance. Additionally, the system allows one to prove that both parties agreed to this exchange. Part of the agreement preferably includes options such that the user may turn off any and all access to his/her data, and the other party is bound to comply with the request of the user. The user retains the ability to do this retroactively at any time and to receive a signed verified promise from the other party that they have complied and done so, where a cryptographic hash of the agreement, signed by all parties, is held by all parties, and the signed hash is also recorded on the superset of all audit services or ledgers specified by any party.

The system of the present invention instantiates a data protection and exchange system that is secure, cryptographically signed, and automated, which allows the agreements about what can be done with one's data to be exchanged over the internet so as to govern that data after it is exchanged. This may also be applied to other agreements, including any type of commercial contract or agreements over the internet. Presently, data exchange can be automatically governed by so-called 'smart-contracts' such as on ETHEREUM, which are in practice black-boxes where code is obfuscated and as a result the outcome of the contract may only be known when that code is executed. This has resulted in situations where unexpected commercial transactions have occurred and value has been stolen due to software bugs, errors, or fraud. Where code cannot be readily understood, it may cause data to be shared without the user's knowledge, and to parties unknown to the user, or worse. It is an object of the present invention to move away from such ambiguous and obfuscated black-boxes, and provide to the user direct and transparent ongoing control over his or her own contractual agreements and data.

A distributed system (non-centralized), with user control disposed across multiple distributed systems, is needed. Unlike blockchain, the present invention offers a means by which data may be described with a graph language, such as JSON-LD, which effectively defines and maps the user data so as to allow seamless transfer of the data from one database to another.

In order to facilitate permissioned data exchange between entities, the data has to be described in a specific way in order to be moved successfully from one database to another. As such, the data must be serialized in order to do so. With a graph language, data can be moved between databases. However, many entities will not permit such exchanges without agreements in place about exactly which data may be exchanged, and what may be done with that data after it is moved. Specific data from databases may be shared via a graph language, but this remains problematic in the absence of an automated agreement regarding what may be done with the data once acquired. The present invention provides a mechanism whereby that agreement is itself written in the graph language, and is expressed in a way that both computers and people may comprehend. The agreement can be signed with standard PKI and, once the agreement is transmitted, a link to the agreement is contained within an audit record of the agreement, so that both parties can show (and any third party can irrefutably confirm) that the agreement that they each hold was also signed by the other party and is valid.

The present invention, referenced as JLINC, uses JSON-LD to express human and machine readable contracts governing what may be done with the data, and an audit trail is easily referenced and maintained within the transfer agreement itself, so that the entities may be held both legally responsible and accountable by reputation. Once companies (entities) sign a binding agreement that they can be held accountable for, both via reputation and legally, then they are much more likely to comply. Companies anywhere in the world that hold or process personal data for EU citizens can be penalized for noncompliance with GDPR by fines of up to 4% of global turnover.

Additionally, the system of the present invention is applicable to three-party interactions, and gives the data rights holder the capacity to maintain control over who has access to his/her data, as well as what may be done with the data after acquisition. The parties involved need not be limited to data holders, financial institutions, and companies, but may also include devices, businesses, and INTERNET OF THINGS (IOT) devices manufactured by corporations.

It should be understood that the present invention may have the following characteristics:

JLINC is a novel way to assemble methods, systems, and techniques to provide confidentiality and to represent fiduciary relationships and accountability for parties sharing data over the global internet. It facilitates control over shared data, provenance of that data, and non-repudiation of data sharing actions. It makes use of modern standards such as JSON linked data, decentralized identifiers, and verified credentials to accomplish these goals.

JLINC offers a unique solution. The inventors realized that while a technical solution was possible, it was not possible for that solution to be purely technical. It consists of an innovative vision of a capability system, one that functions well on disparate systems running different kinds of code on dissimilar machines in separate organizations.

JLINC is comprised of a key management system, an agreement management system, a communication protocol, and an auditing system, all assembled to work together in a new way to achieve the goal of a capability system that serves to make confidential exchanges between entities secure and provenance-preserving. It introduces a technical means to make fiduciary relationships between parties straightforward to create and audit.

In JLINC, separate computer systems act as agents for entities—either individuals, organizations, or other kinds of groups. An agent operates independently to represent the interests of its party to other entities via their agents. Each agent can create any number of entries on behalf of its user in an identity system that creates identifiers that point to the public part of public-private key-pairs. JLINC in its current instantiations uses a method derived from a distributed identity standard called a DECENTRALIZED IDENTIFIER (DID), but other suitable systems may arise in the future that would also be compatible with JLINC.

JLINC then provides methods for the parties being represented to select a mutually agreeable contract—a Standard Information Sharing Agreement or SISA—and to mutually cryptographically sign the selected agreement with their respective keys, each retaining a copy and optionally transmitting another copy to an audit service of their choosing. In its current instantiation JLINC uses a standard data representation technique called JSON-LD, although other suitable representation systems may arise in the future that would also be compatible with JLINC.

A SISA is a human-readable legally negotiable contract that at a minimum establishes a fiduciary confidentiality agreement between two parties. It requires each party to conform its use of any data transmitted via JLINC from the other to the requirements as stated in the SISA. Such data may include a requirement to conform such use to the preferences of the user as they may change from time to time. These preferences are also transmitted via JLINC as data.

Each data transmission is accompanied by a cryptographic hash of the SISA and signed by the transmitter and receiver, again each retaining a copy and optionally transmitting another copy to an audit service of their choosing. These are called SISA events and provide a non-refutable history of data and preference exchange under the SISA agreement.

SISAs may also be crafted to require a receiving party to only pass on data from the originator to other parties that also use JLINC to agree to the same SISA, thus creating a chain-link confidentiality system.

In the event of a dispute of any kind, the issue may be adjudicated via traditional means, but using the audits of the SISAs and SISA events to establish a cryptographically and mathematically non-refutable history of the facts of the exchanges and agreements between the various parties.

For some use cases a verified credential may be required. JLINC currently uses the VERIFIED CREDENTIAL standard published by the WORLD WIDE WEB CONSORTIUM (W3C), but other suitable mechanisms that accomplish the same task may be substituted.

Other apparatuses, methods, features, and advantages of the disclosure will be or will become apparent to one with skill in the art upon examination of the following figures and detailed description. It is intended that all such additional systems, methods, features, and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed systems, methods, and techniques. These drawings in no way limit any changes in form and detail that may be made to the disclosure by one skilled in the art without departing from the spirit and scope of the disclosure. The present invention will be better understood with reference to the appended drawing sheets, wherein.

DESCRIPTION

Figure 1A:
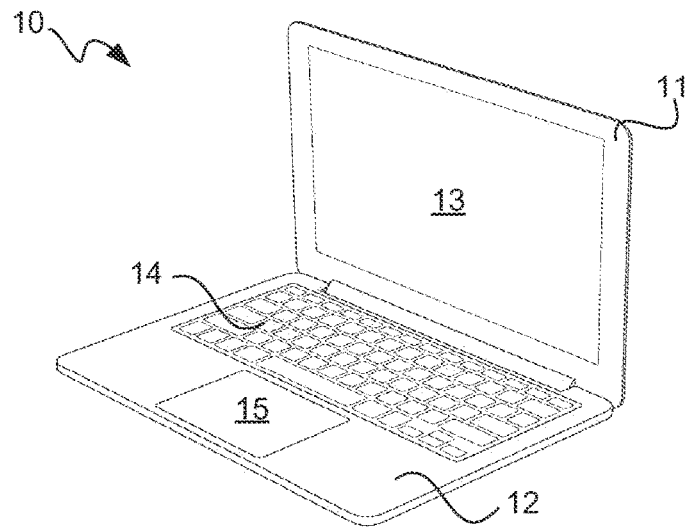
FIG. 1A illustrates in front perspective view an exemplary computing device suitable for use with an electronic marketplace system according to one embodiment of the present disclosure.

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment, Further, when a particular feature, structure, or characteristic is described in connection with an embodiment, it is submitted that it is within the knowledge of one skilled in the art to effect such feature, structure, or characteristic in connection with other embodiments whether or not explicitly described.

Exemplary applications of apparatuses and methods according to the present disclosure are described in this section. These examples are being provided solely to add context and aid in the understanding of the disclosure. It will thus be apparent to one skilled in the art that the present disclosure may be practiced without some or all of these specific details. In other instances, well known process steps have not been described in detail in order to avoid unnecessarily obscuring the present disclosure. Other applications are possible, such that the following examples should not be taken as limiting.

In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

In various embodiments of the present disclosure, electronic marketplace systems and components thereof are provided to facilitate protected data transfers across disparate servers or networks that extend beyond the simple cases involving just a single server or network. In other embodiments, various methods are provided for protecting data transfers between users on systems distributed across disparate servers or networks. In still further embodiments, various computer readable mediums are provided for similarly protecting data transfers between users on systems distributed across disparate networks.

While such embodiments are often characterized herein as between a user and vendor for goods or services, for example, it will be understood that such data transfers can also take place between any two parties in any form of business or personal relationship.

Furthermore, while such embodiments are often characterized herein as involving the transfer of personal data or information, it will also be understood that such data transfers can involve the use of any protected data or any other data at all between any two parties, and not just personal data.

In general, the transfer of data across disparate servers and/or networks can take place subject to an automated digital contractual process that is agreed upon between the parties exchanging data prior to the data being exchanged. In a general case, there can be a "requesting" party and a "responding" party with respect to the data that is to be exchanged. In some specific instances, one of these parties can be a "user" or customer, while the other is a "vendor" or provider. For example, a vendor or provider might be the requesting party with respect to the personal or other protected data of a user or customer that might be the responding party. Again, other types of parties and arrangements may also apply, such that any business to business (B2B) or protected exchange of data between parties can be implicated. In such situations, either party could propose, or counter propose, a contract that would specify the terms under which the data would be exchanged. Such a contract can be or can include a "link contract" which is a link within an electronic communication that is proposed, negotiated, and agreed upon electronically and in an automated and streamlined fashion between the parties. This link contract can then govern what either party is able to do with the information that is about to be exchanged. Under this approach, a given user can be much more empowered and in control of their own data prior to sending it or authorizing its release across the Internet in general or across other disparate networks.

Referring first to FIG. 1A, an exemplary computing device suitable for use with the various electronic marketplace systems and methods therefor is shown in front perspective view. Computing device 10 can be a laptop computer, and can be particularly adapted to provide access to and functionality within an electronic marketplace system as provided herein. Such access and use could be for any user, customer, vendor, provider, individual, group, business, or other entity, as will be readily appreciated. It will be readily appreciated that computing device 10 can be provided in numerous other configurations and formats while still being able to provide the disclosed access and functionality with respect to an electronic marketplace system, such that the provided laptop example is for illustrative purposes only.

In general, computing device 10 can include an upper portion 11 and a lower portion 12. Upper portion 11 can include a display component 13 having a display region thereupon, while lower portion 12 can include various input devices, such as a keyboard 14 and touchpad 15. Lower portion 12 may also include a processor (not shown) therewithin, which can be adapted to process information regarding marketplace system activities, which can include data transfers, searching for information, providing information, proposing, negotiating, or authorizing link contracts, and the like. Such a processor can be coupled to the display component 13 and the input devices 14, 15, as well as other components of the computing device. Such other computing device components or items not shown may also be included, as will be readily appreciated, with such items including, for example, speakers, memories, busses, input ports, disk drives, power supplies, wireless interfaces, and the like.

Figure 1B:
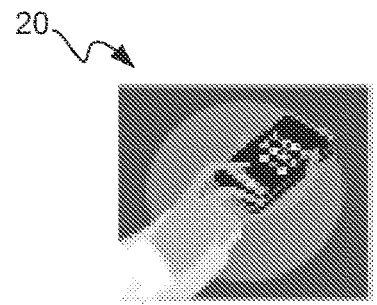
FIG. 1B illustrates in front perspective view an alternative exemplary computing device suitable for use with an electronic marketplace system according to one embodiment of the present disclosure.

FIG. 1B illustrates in front perspective view another alternative exemplary computing device that may also be used with the disclosed systems and methods. Smart phone 20 can similarly be used to provide access to, and functionality within, an electronic marketplace system as provided herein. As in the foregoing computing device 10, smart phone 20 can include at least a processor, a display component having a display region, and one or more input devices such as a touchscreen, button(s), and/or a keypad. In various embodiments, an electronic marketplace system can be provided as an application or "app" on or in an app store that can be accessed from smart phone 20. Such an app can be downloaded and then accessed or used on the phone 20.

Figure 1C:
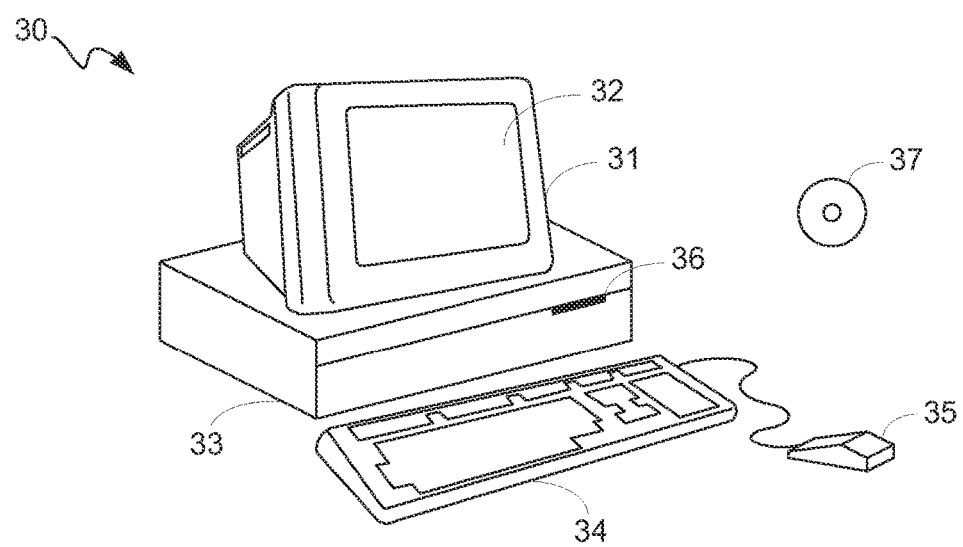
FIG. 1C illustrates in front perspective view another alternative exemplary computing device suitable for use with an electronic marketplace system according to one embodiment of the present disclosure.

FIG. 1C illustrates in front perspective view another exemplary computing device suitable for use with the disclosed embodiments. Computer system 30 can be, for example, a home or office computer system adapted to communicate over the Internet or other network. Such communication can also facilitate access to and functionality within an electronic marketplace system as provided herein. Computer 30 can include, for example, a display monitor 31 having a single or multi-screen display 32 (or multiple displays), a cabinet 33, a keyboard 34, and a mouse 35. The cabinet 33 houses a drive 36, such as for receiving a COMPACT DISC READ-ONLY MEMORY (CD-ROM) 37, a system memory and a mass storage device (e.g., a hard drive or solid-state drive) (not shown) which may be utilized to store retrievable software programs incorporating computer code that implement one or more embodiments of the invention, data for use with the embodiment(s) of the invention, and the like. Although the CD-ROM 37 is shown as an exemplary computer readable medium, other computer readable digital media including floppy disks, tapes, flash memories, system memories, and hard drives may be utilized, as will be readily appreciated.

Although several examples of computing devices suitable for use with the disclosed electronic marketplace systems, methods, and other items have been provided in FIGS. 1A-1C, it will be readily appreciated that many other forms of electronic devices may also be suitable for such purposes. For example, electronic devices that may also be suitable can include a system server, tablet computer, personal digital assistant, or the like, among other possible items.

According to different embodiments, various different types of encryption/decryption techniques may be used to facilitate secure communications between devices within an electronic marketplace system and/or across other networks. Examples of the various types of security techniques which may be used may include, but are not limited to, one or more of the following (or combinations thereof): random number generators, SHA-1 (SECURED HASHING ALGORITHM), MD2 (MESSAGE DIGEST 2), MD5 (MESSAGE DIGEST 5), DES (DIGITAL ENCRYPTION STANDARD), 3DES (TRIPLE DES), RC4 (RIVEST CIPHER), ARC4 (ALLEGED RC4, related to RC4), TKIP (TEMPORAL KEY INTEGRITY PROTOCOL, uses RC4), AES (ADVANCED ENCRYPTION STANDARD), RSA (RIVEST-SHAMIR-ADLEMAN), DSA (DIGITAL SIGNATURE ALGORITHM), DH (DIFFIE-HELLMAN KEY EXCHANGE), NTRU (NUMBER THEORY RESEARCH UNIT), ECC (ELLIPTIC CURVE CRYPTOGRAPHY), PKA (PRIVATE KEY AUTHENTICATION), DEVICE-UNIQUE SECRET KEY and other cryptographic key data, SSL (SECURE SOCKETS LAYER), quantum-entangled data, etc. Other security features contemplated may include use of well-known hardware-based and/or software-based security components, and/or any other known or yet to be devised security and/or encryption/decryption processes implemented in hardware and/or software. Software, hardware and/or software plus hardware hybrid embodiments of the various electronic marketplace systems, methods, and techniques described herein may be implemented on a general-purpose programmable machine selectively activated or reconfigured by a computer program stored in memory. Such programmable machine may include, for example, mobile or handheld computing systems, Personal Digital Assistants (PDAs), smart phones, notebook computers, tablets, netbooks, desktop computing systems, server systems, cloud computing systems, network devices, and the like.

Figure 2:
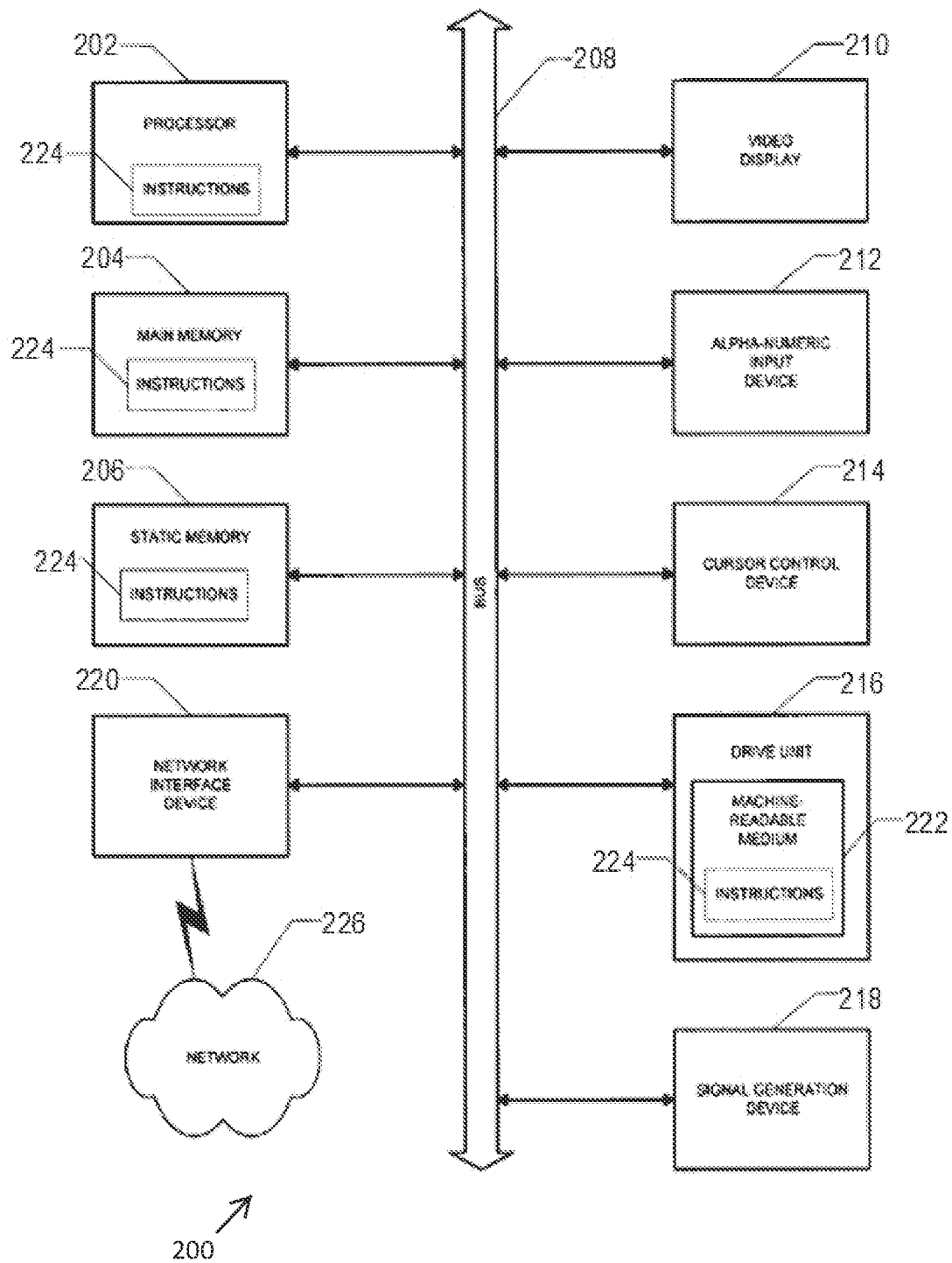
FIG. 2 illustrates in block diagram format an exemplary client or end user computing device or system suitable for use with an electronic marketplace system according to one embodiment of the present disclosure.

Turning next to FIG. 2, an exemplary client or end user computing device or system 200 suitable for use with an electronic marketplace system according to one embodiment of the present disclosure is illustrated in block diagram format. Computing device or system 200 can be identical or similar to any of the foregoing computer devices 10, 20, and/or 30, as well as any other suitable computing device, system, or component that may adapted for providing access and functionality within any of the disclosed electronic marketplace systems and/or methods or other embodiments.

Computing device or system 200 may contain a set of instructions for causing itself or another networked machine to perform any one or more of the methodologies discussed herein. As such, computing device or system 200 may operate as a standalone device or machine, or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Further, while only a single machine is illustrated, the term "machine" shall also be taken to include any collection of machines that individually or jointly execute a set (or multiple sets) of instructions to perform any one or more of the methodologies discussed herein.

Exemplary computer device or system 200 includes a processor 202 (e.g., a central processing unit (CPU), a graphics processing unit (GPU), or both), a main memory 204 and a static memory 206, which communicate with each other via a bus 208. The computer device or system 200 may further include a video display unit 210 (e.g., a liquid crystal display (LCD) or a cathode ray tube (CRT)), and also an alphanumeric input device 212 (e.g., a keyboard), a user interface (UI) navigation device 214 (e.g., a mouse), a disk drive unit 216, a signal generation device 218 (e.g., a speaker) and a network interface device 220. The disk drive unit 216 includes a machine-readable medium 222 on which is stored one or more sets of instructions and data structures (e.g., software 224) embodying or utilized by any one or more of the methodologies or functions described herein. The software 224 may also reside, completely or at least partially, within the static memory 206, the main memory 204 and/or within the processor 202 during execution thereof by the computer device or system 200, wherein the main memory 204 and/or the processor 202 may also be or may include machine-readable media.

The software 224 may further be transmitted or received over a network 226 via the network interface device 220 utilizing any one of a number of well-known transfer protocols (e.g., Hypertext Transfer Protocol (HTTP), Hypertext Transfer Protocol Secure (HTTPS), and so forth). While the machine-readable medium 222 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure, or that is capable of storing, encoding or carrying data structures utilized by or associated with such a set of instructions. The term "machine-readable medium" shall accordingly be taken to include, but shall not be limited to, solid-state memories, optical and magnetic media, and carrier wave signals.

According to various embodiments, computing device or system 200 may include a variety of components, modules and/or systems for providing various types of functionality. For example, in at least one embodiment, device or system 200 may include a web browser application which is operable to process, execute, and/or support the use of scripts (e.g., JAVASCRIPT, ASYNCHRONOUS JAVASCRIPT (AJAX), etc.), plug-ins, executable code, virtual machines, HYPERTEXT MARKUP LANGUAGE 5 (HTML5) vector-based web animation (e.g., ADOBE FLASH), etc. In at least one embodiment, the web browser application may be configured or designed to instantiate components and/or objects at the device or system 200 in response to processing scripts, instructions, and/or other information received from a remote server such as a web server. Examples of such components and/or objects may include, but are not limited to, user interface (UI) components, database components, processing components, and other components that may facilitate and/or enable device or system 200 to perform and/or initiate various types of operations, activities, and functions, such as those described herein with respect to accessing and functioning within an electronic marketplace system.

Figure 3:
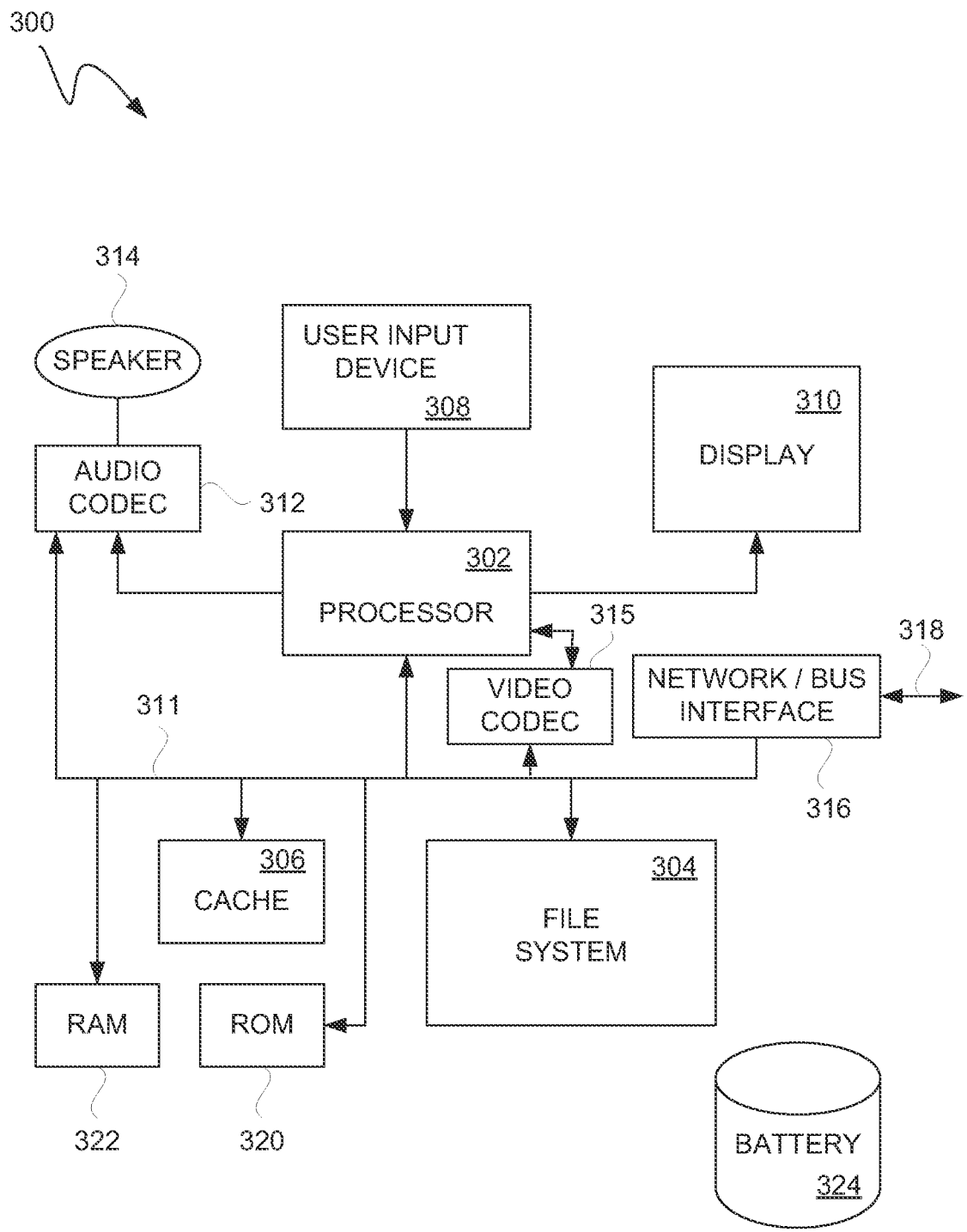
FIG. 3 illustrates in block diagram format an exemplary client system for a mobile device suitable for use with an electronic marketplace system according to one embodiment of the present disclosure.

Continuing with FIG. 3, a block diagram of an exemplary client system for a mobile device suitable for use with an electronic marketplace system is provided. Mobile device 300 can be, for example, a smart phone, portable media player, personal digital assistant, tablet computer, laptop computer, or any other electronic device suitable for running applications that can include access to (and functionality within) an electronic marketplace. Although device 300 depicts circuitry of a representative portable electronic device, it will be readily understood that some elements may be omitted and others may be added in other electronic devices that may be suitable to function in a similar manner. In at least one embodiment, the mobile device client system 300 may include an Electronic Marketplace Mobile Device App Component, which has been configured or designed to provide functionality for enabling or implementing at least a portion of the various electronic marketplace functions and techniques at the mobile device client system. Such a mobile device app component can be provided for download by a service provider, such as an app store for smart phone devices.

Portable electronic device 300 can include a processor 302 that pertains to a microprocessor or controller for controlling the overall operation of the device. Device 300 can store data pertaining to various applications, programs, functions, and transaction histories in a file system 304 and a cache 306. The file system 304 can include semiconductor memory (e.g., Flash memory) and/or one or more storage disks. File system 304 can provides high capacity storage capability for the device 300, while cache 306 can provide low capacity but high speed storage capability, as will be readily appreciated. The cache 306 may be or may include, for example, Random-Access Memory (RAM) provided by semiconductor memory. Device 300 can be powered by a battery 324, which may be rechargeable. Device 300 can also include a RAM 322 and a Read-Only Memory (ROM) 320. The ROM 320 can store programs, utilities, or processes to be executed in a non-volatile manner. The RAM 322 provides volatile data storage, such as for the cache 306.

Device 300 can also include one or more user input devices 308 that allows a user of the device to interact with the device. For example, the user input device(s) 308 can take a variety of forms, such as a button, keypad, dial, touch-sensitive surface, and the like. Still further, the electronic device 300 can include a screen display 310 that can be controlled by the processor 302 to display information to the user. A data bus 311 can facilitate data transfer between at least the file system 304, the cache 306, the processor 302, an audio coder/decoder (CODEC) 312 and/or a video CODEC 315, among other components. Electronic device 300 can also include a network/bus interface 316 that couples to a data link 318 or other communication device or interface. The data link 318 allows the device 300 to couple to or otherwise communicate with another device or over a network. The data link 318 can be provided over a wired connection or a wireless connection. In the case of a wireless connection, the network/bus interface 316 can include a wireless transceiver. In some embodiments, the data link 318 can also provide power to the device 300 (e.g., to charge the battery 324).

It will be readily appreciated that each of the foregoing computing devices and systems can be used by any user, vendor, or other party in conjunction with protected data transfers over disparate servers and/or networks, such as the Internet in general, as provided herein. In effect, these devices and systems can function as end points for various parties accessing an overall electronic marketplace system where such protected data transfers can take place. Access control and restrictions for such protected data transfers is ideally achieved by users at these end points. In particular, data sharing between separate parties or entities over the Internet or other disparate networks can utilize a new "consent management layer" as provided herein.

Figure 4:
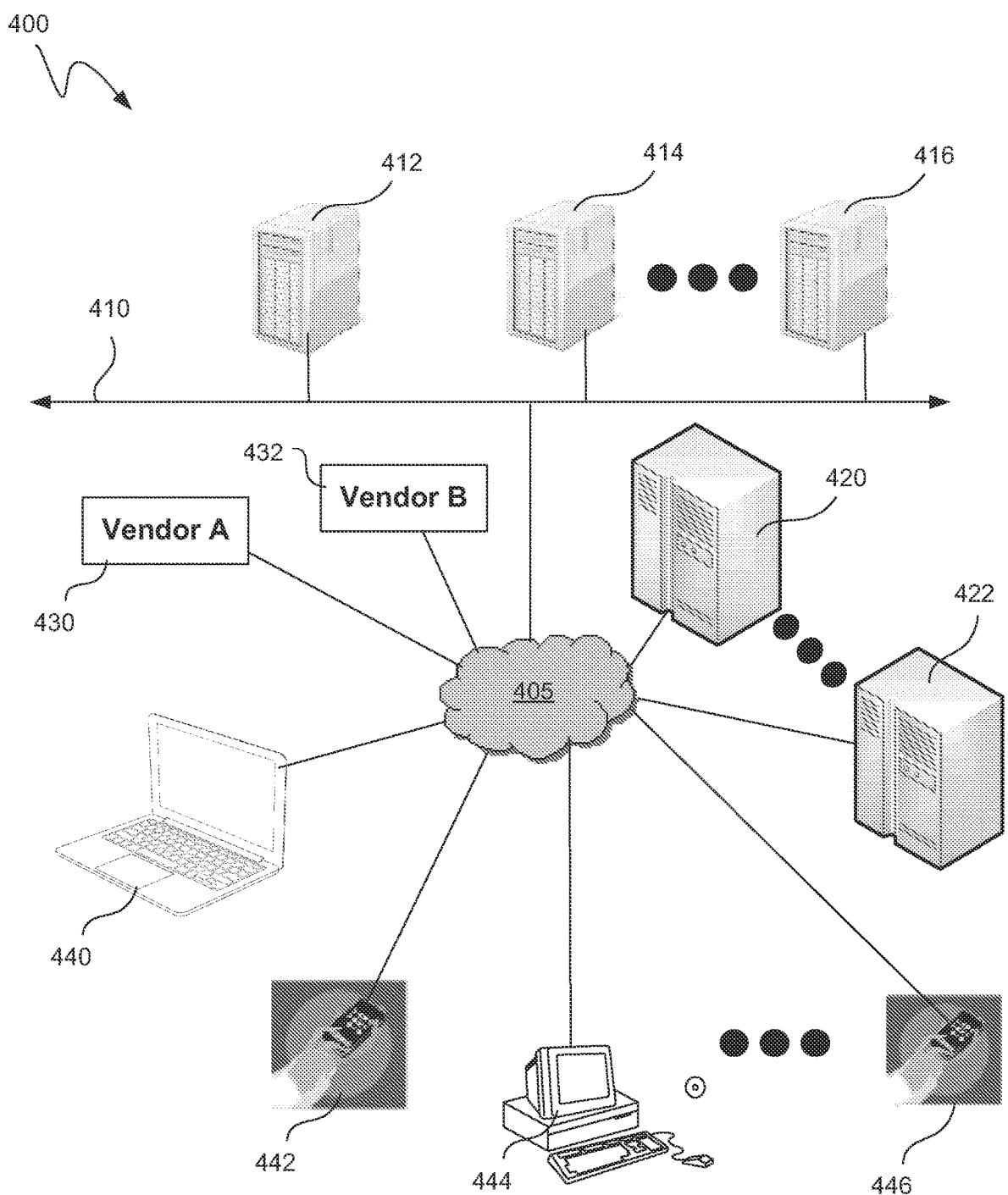
FIG. 4 illustrates in block diagram format an exemplary electronic marketplace system adapted for providing protected data transfers thereacross according to one embodiment of the present disclosure.

Turning next to FIG. 4, an exemplary electronic marketplace system adapted for providing protected data transfers thereacross is presented in block diagram format. Wide area electronic marketplace system 400 can include a variety of components and items, starting with at least one or more link contract servers 420, 422, each of which can include or can be coupled to one or more communication devices adapted to facilitate digital communications over the Internet 405 or another network or entity/element to various system users.

Other components that can be part of an electronic marketplace system 400 or greater distributed network can include a plurality of public key identity servers 412, 414, 416, which can be interconnected such as on a mesh network 410 that is coupled to an overall cloud or network 405, such as the Internet. It will be readily appreciated that many more servers than the three shown public key identity servers 412, 414, 416 and the two shown link contract servers 420, 422 can be provided in a typical electronic marketplace system, and that there may in fact be dozens, hundreds, thousands, or more of each type of server. Various aspects and functions for these public key identity servers 412, 414, 416 and these link contract servers 420, 422 are provided in greater detail below.

In addition to the various servers set forth above, the electronic marketplace system can also include various users or members, such as one or more vendors 430, 432, and also one or more users 440, 442, 444, 446, which can all be interconnected via an overall cloud or network 405, such as the Internet. Again, there may be many more than just two vendors or providers 430, 432, as well as many more than just four users or customers 440, 442, 444, 446. Each of these vendors, users, and/or other parties can use any of the foregoing computing devices and/or other components for access and operability within the overall system 400, as will be readily appreciated. In addition to the various items shown for electronic marketplace system 400, there may also exist further items or resources, such as a separate central database, contract repository, contract escrow server, link contract type index server or server portion, contract aggregation server (all not shown), and so forth, as may be desired. Alternatively, or in addition, such items, functions, or server elements may be contained on one or more of the link contract servers 420, 422, which link contract servers, their specific functions, and their ability to interact with the other system components may provide a substantial basis for overall system 400 and its functionality. In short, link contract servers 420, 422 may in implementations provide key functionalities and protocols with respect to the ability to have secure data transfers or portability across network or Internet 405.

Other efforts to provide for data transfers or exchanges across networks in a similar context can be found at, for example, U.S. Patent Publication No. 2012/0290427 to Reed, et al. ("Reed"). As shown by Reed, a "trusted" network of clients and servers can cooperate to maintain a logical graph of information describing the relationships between members of the network, the data associated with each member, and the permissions each member grants to other members to access and operate on the data and relationships described in the logical graph. This logical graph may be represented and serialized using many different data structures and serialization formats. Open standard formats can be used for interoperability, such as the EXTENSIBLE MARKUP LANGUAGE (XML) format (as defined by the WORLD WIDE WEB CONSORTIUM in XML 1.1 (Second Edition) and XML SCHEMAS 1.1) the JAVASCRIPT OBJECT NOTATION (JSON) format (as defined by the INTERNET ENGINEERING TASK FORCE in RFC 4627), the RDF format (RESOURCE DESCRIPTION FRAMEWORK, as defined by the WORLD WIDE WEB CONSORTIUM), and the EXTENSIBLE DATA INTERCHANGE (XDI) format (as defined by the XRI DATA INTERCHANGE TECHNICAL COMMITTEE at the ORGANIZATION FOR THE ADVANCEMENT OF STRUCTURED INFORMATION STANDARDS (OASIS)), among others. Various other details and examples regarding the implementation and use of such open standard formats can be found throughout Reed, which is incorporated herein by reference for such purposes.

As provided by the various embodiments disclosed herein, trusted automated data transfers or exchanges can alternatively result from an enforceable, legally binding, machine readable, and relatively simple protocol for managing dynamically updated permissions to granular data across the Internet or other disparate servers or networks. In order to achieve such results, again various forms of link contracts can be implemented between parties that are to transfer or exchange such data, which can take place on, for example, one or more link contract servers 420, 422. The use of such link contracts can ultimately allow a wider variety of more protected transactions involving the exchange or portability of data. For example, an improved customer "intention-casting" can replace general or even targeted advertising with a permission-based data exchange. Other types of business-to-business data transfers or exchanges can also be subject to such automated, simple, yet legally binding link contracts. In addition to allowing for improved intention-casting, and more secure data portability or transfers, improved vendor or social search abilities that respect the stated desires of the targets of the search for the use of their data can be obtained through the use of link contracts.

In general, intention-casting describes an environment where a user can express interest in a particular type of product, service or activity, and vendors who would like to serve that interest can contact the user in a way that does not undermine the privacy and control of the user over its own personal data, or other protected data in general. For a user or customer this provides a way to view offers or advertisements only for things of actual expressed interest, as well as the ability turn off the flow of such information once a purchase is complete or there is otherwise no longer interest. For a vendor or provider such intention-casting provides a channel to customer attention that is far more efficient and potentially effective than general or even "targeted" advertising, as well as to establish positive relationships with customers rather than annoying them with unwanted advertising bombardment. Such intention-casting can also open up the opportunity to display for vendors a real-time view of a more accurate moment to moment state of the market for their offerings.

As noted above, data portability generally refers to the possibility for users to move the data that they have created about themselves, or that has been created about them as a result of their activities, from one online data host to another. Greater security or protections in such data portability of personal information, or for data transfers of other protected information or any other information in general, can be had by way of link contracts that specifically restrict or otherwise proscribe what other parties can and cannot do with the data being transferred.

Vendor or social search refers to the capability for a vendor, provider, or other user or party to enter search terms into a system or an application thereof and discover information about and communication channels with customers and other users matching the entered search terms. Such searching abilities can be categorized, indexed, stored, and made available according to various categories, which can include the desired products or services, as well as the terms under which a given user is willing to release his or her protected information. Vendors or other users who are inclined to search for customers or other users by way of desired products or services can also then be permitted to search by way of what such customers or users are willing to allow with their information.

The current state of the art generally allows for a reasonable level of intention-casting, secure data portability, and search capabilities within a single network, and such offerings tend to be mostly an all-or-nothing proposition. In some such applications, a user still loses any control over what is done with his or her protected information once it is shared. Attaining all of these items over the Internet or over disparate networks in general is not currently available in the prior state of the art, at least with respect to secure and controlled data portability.

In contrast, the presently disclosed embodiments provide for improved intention-casting, data portability and respectful social search over the Internet or other disparate servers or networks. This can be accomplished by providing a protocol that includes a suitable data graph element, a link contract element, and an identity layer element that all work in tandem with each other. A working title for this new protocol can be, for example, "JLINC" (JSON-LD Link Contract).

For the data graph element, in implementations it may be preferable to use a suitable open standard format, such as one that utilizes human-readable text, for example. Such an open standard format can be in the form of JAVASCRIPT OBJECT NOTATION (JSON), and in particular JSON FOR LINKED DATA (or FOR LINKING DATA) (JSON-LD). It is specifically contemplated that the JSON-LD standard (see, e.g., http://www.w3.org/TR/json-1d and http://json-1d.org) can be particularly useful for purposes of the present embodiments, although any standard format that can be used across many disparate platforms and networks might also be suitable for such data graph purposes. In particular, JSON-LD documents are completely standards compliant for most or all applications, and are therefore readable, parseable, and writable by all of the many JSON libraries. In fact, it is believed that every modern language used for web development has a JSON library. JSON-LD is also backwards compliant with the RESOURCE DESCRIPTION FRAMEWORK SCHEMA (RDF) standard, such that any RDF document can be expressed in JSON-LD and vice-versa.

Figure 5:
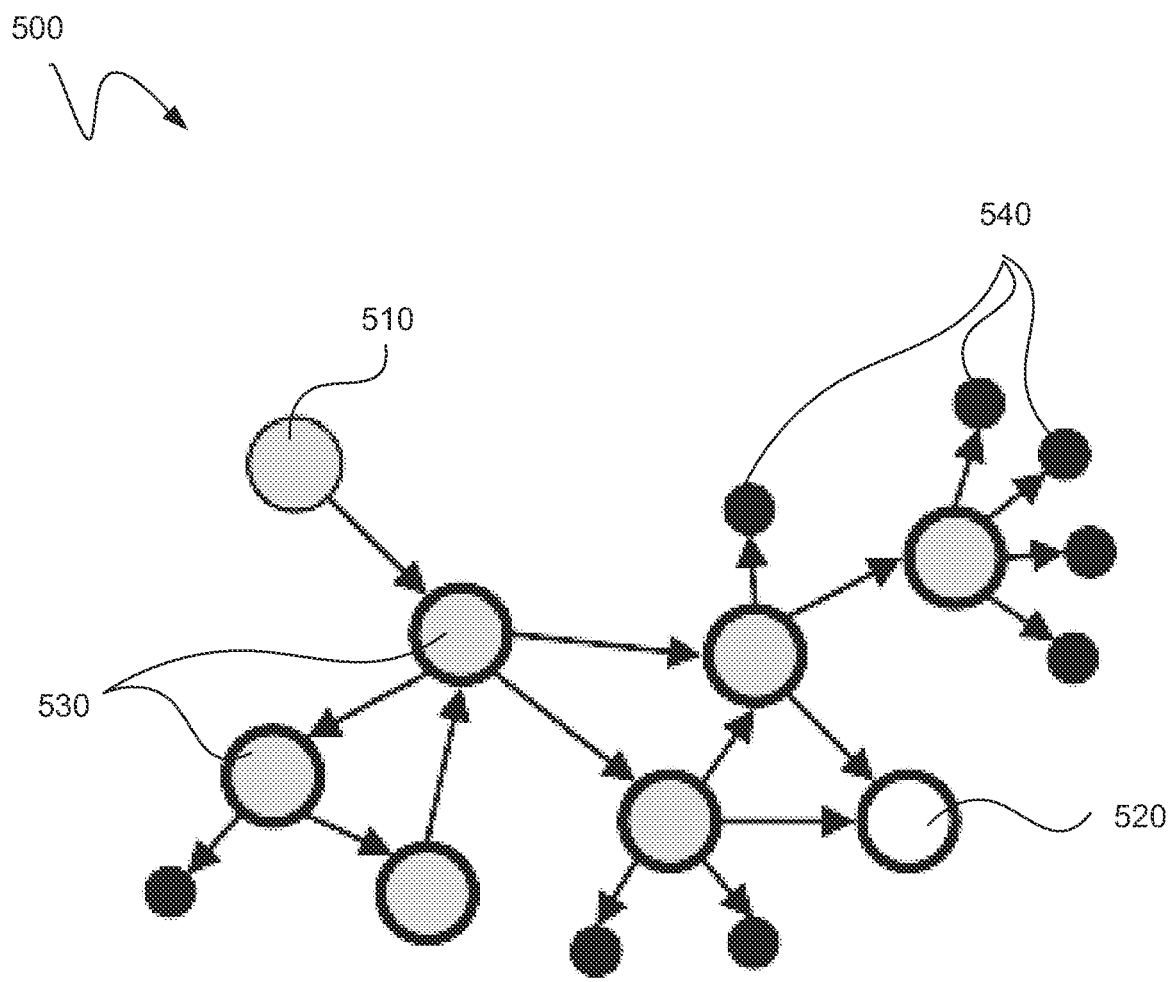
FIG. 5 illustrates in block diagram format an exemplary linked data graph that can be used for an electronic marketplace system across disparate servers or networks according to one embodiment of the present disclosure.

FIG. 5 illustrates in block diagram format an exemplary linked data graph that can be used for an electronic marketplace system across disparate servers or networks according to one embodiment of the present disclosure. Linked data graph 500 can be in JSON-LD format, for example, and can include various nodes, such as subject 510, object 520, subject/objects 530, and a plurality of values 540. Various nodes in graph 500 can be called subjects or objects, while edges are called properties. A subject 510, 530 is a node with at least one outgoing edge whereas an object 520, 530 is a node with at least one incoming edge. Thus, a node can be a subject and an object 530 at the same time.

Although a subject should be labeled with an INTERNATIONALIZED RESOURCE IDENTIFIER ("IRI"), JSON-LD also supports unlabeled nodes. Even though such nodes do not fulfill the requirements of Linked Data, they are supported as they allow certain use cases which require just locally referenceable data. The same applies to properties or edges, in that if they are labeled with an IRI then they are referenceable from other documents and are thus Linked Data. Otherwise they are just traditional JSON properties that only have a meaning in the specific document where they are used.

This kind of flexibility in a JSON-LD linked data graph renders this particular standard as being very suitable for purposes of the presently disclosed embodiments and their ability to operate across most all networks, systems, and architectures. In general, JSON objects are collections of key/value pairs, and JSON-LD extends JSON simply by creating some standard keys. The two most important of these are @id and @context.

These can be understood as type signifiers. The @id key indicates that its corresponding value is an IRI, while the @context key has a value that can be either an IRI reference or an included object. These particular properties can provide an excellent way in which to create link contracts on a link contract server, as set forth below.

For the link contract element, various link contracts can be provided or created for, by, and between users, vendors, and various other parties on an electronic marketplace system. Such link contracts can be provided, accessed, offered, negotiated, agreed to, and otherwise used on one or more link contract servers on the system, such as link contract servers 420, 422. Again, dozens or hundreds of link contract servers may be present on an overall system, each of which may have partial or full functionality, as well as one or more other functions or aspects that may be in addition to link contract server abilities. In various embodiments, different users, parties, or entities may operate different link contract servers on the same overall system. It is specifically contemplated that each such party that may operate one or more link contract servers can be operating its own electronic marketplace system as its own system or a subset of a greater electronic marketplace system having additional link contract servers and/or other components.

In general, link contracts can be provided between two parties on the overall system prior to an exchange or porting of data between the parties or from one party to the other. As one general non-limiting example, a user or customer may desire to provide personal information or other protected information to a potential vendor or provider.

Such personal information can include the username, gender, age, address, phone number, credit card number, social media account(s), transaction histories, online reputation, relationships with other users and vendors, and/or other informational items, for example. Again, other information can also be transferred or exchanged, and it will be readily understood that the present subject matter can be applied to all such information.

The user may wish to limit or restrict how the vendor will use this information, and as such can make sure that the appropriate terms restricting use of the data are in place in a digitally signed linked contract prior to allowing or authorizing the transfer or porting of this information. Such restrictions can include, for example, that the information can be used only by the vendor and/or other specified parties associated with the vendor, that the information can only be used in order to formulate a specific offer to the user, or to reference or properly identify the user, and/or that the information may only be used for the next hour, day, week, or other time period, for example. Other terms or restrictions on the use of the data may also apply.

These and other terms as may be appropriate can be put into a link contract that then binds the user and the vendor, or other parties prior to a data transfer, as may be appropriate. Such terms may be contained in standard link contracts or portions thereof, which can be readily accessible and used by the user and/or vendor in order to make a specific link contract for a specifically contemplated upcoming data transfer. These contract terms can be contained on one or more link contract servers 420, 422, and/or may be located elsewhere online. Such remotely-located places for contract terms can either be referenced, such as by pointers within a given link contract, or can be accessed for full copy-and-paste functionality into a given link contract. In various embodiments, there may be one or more databases or repositories for such link contract terms, provisions, portions, and full contracts. This ability to formulate link contracts for various marketplace purposes may be accomplished in a fully or partially automated manner in various embodiments. For example, where a typical user may submit an inquiry for information regarding cars or tires online, there may be one or more standard link contracts for vendors in these fields which can then pop up and be offered to the user. Alternatively, or in addition, one or more repeat users of the system may prefer their own link contracts when they go onto the system to look for or inquire about one or more goods or services. In instances where a user and a vendor each propose their own stock or standard link contract to each other, then some amount of negotiation and changes may need to be made prior to arriving at a final link contract to be signed by both. In some situations, an artificial intelligence or other element/aspect may assist in proposing one or more compromises or alternative terms, so as to streamline the contract formation process. For example, where a user proposes his or her own standard link contract that restricts the use of his or her data to the next day, but a car company has its own standard link contract that asks for a 2 week period to use the data, the system may propose a one week period.

In various embodiments, the system can include one or more link contract index server portions, which can be contained on one or more of the link contract servers themselves, and/or may be contained at one or more third party locations. Such link contract server portions can contain actual contracts and/or links to contracts that are similar or concern similar data with respect to a current link contract of interest that is being formulated and/or finished. In such embodiments, at least a portion of the link contract can point to one or more link contract index server portions or third party locations that contain standard contract terms, contract portions, or entire contracts, for example. Such items can be used as a starting point for creating a new link contract in an automated manner, and/or can be used as a linked reference for a finished link contract.

With respect to the actual link contract itself, this item can be provided in JSON-LD format, and may be communicated over HTTP and/or HTTPS, such as in an HTTP or HTTPS header. As such, the link contract is very likely to be communicated to each party and across all networks and servers in a manner that is readable regardless of the various languages and protocols used by each party and any other entity in between. For the link contract, an @context link-contract object can define all the link contract terms, which could include pointers to other documents (e.g., European Union (EU) regulations), and can be included in the data graph either copied in whole, or just with an IRI pointer, for example.

In various embodiments, a vendor, provider, or other party wishing to request data about another user (i.e., a "requesting user") could first issue an "OPTIONS" request, which is a standard HTTP call commonly used in the WEBSOCKET protocol, for example.

Such an OPTIONS request could be asking for link contract information. A user, customer, or other party wishing to respond to this request for data (i.e., a "responding party") could then respond to the OPTIONS request via a suitable link contract server with a JSON-LD document representing an appropriate link contract as requested. If there is agreement, then the user could digitally sign the link contract and include it in the header of a regular GET request. The vendor could sign the link contract as well. If authorization is proper, then the link contract server could record the signed link contract and deliver the requested data to the vendor. Other details are also possible for such a transaction, as provided elsewhere herein. Various embodiments can include one or more ways to communicate these link contracts back and forth, such as, for example, via HTTP headers. One useful standard for that can be by way of a JSON WEB TOKEN (JWT), which provides a "compact, URL-safe means" to send signed JSON documents over the Internet or other disparate networks (see, e.g., https://tools.ietf.org/html/draft-ietf-oauth-j son-web-token-30). Such a JWT can use, for example, a MESSAGE AUTHENTICATION CODE (MAC) to ensure that a given payload has not been tampered with, or an asymmetric key for identification and non-repudiation, such as to prove that a party agreed to the link contract. In various embodiments of the present disclosure, a JWT having a MAC can be used as a means for including a given link contract with an OPTIONS response header, thus ensuring that the link contract that is returned is the exact one that was sent. The ensuing GET request can include the JWT, now signed by the other party, which can then be used to record and prove agreement.

For the identity layer element, a plurality of public key identity servers 412, 414, 416 can be used. In various embodiments, each user identity can be globally unique, the identity layer can be as decentralized as possible, and the identity verification process can be easy for users to manage and share. In various embodiments, a public/private encryption key system can be used for each user identity. The plurality of public key identity servers, which again can form a mesh network, can also include the public key part (i.e., asymmetric key) of such a public/private key pair for each user. As such, each user identity can be its public key, since the ability to prove possession of the corresponding private key by providing a cryptographically valid signature is the way that identities can interact for authentications and link contract exchanges. In other words, a public key may be the root of the data graph for each system user. In various arrangements, blockchains can be used for the purpose of registering identities and associating them with a public key. Blockchains have a number of attractive properties, including being mathematically provably secure, global in scope, and having no requirements for any central authority. There are drawbacks to blockchains, however, including a relatively slow overall process and a need for volunteers on the network to do proof of work calculations in a competitive manner.

In various embodiments, a last closed ledger protocol for a mesh network of public key identity servers can be used. In such arrangements, each user can transact on the system through one trusted node, and that node in turn has a set of nodes that it also trusts. This can result in a relatively small subset of all the nodes in a global system that can grow to any size. This can be substantially similar to a RIPPLE PROTOCOL, which can arrive at a mathematically provable consensus in a very short time, such as on the order of one second or less (see, e.g., https://ripple.com/files/ripple_consensus_whitepaper.pdf). Such a RIPPLE PROTOCOL generates a global append-only ledger with respect to financial transactions, which can also be an abstract definition of a blockchain. This can be termed a "last closed ledger," and this specific RIPPLE PROTOCOL and its implementing technology is currently freely available under a permissive open source license.

In various embodiments, a similar protocol to the foregoing can be applied to transactions that register and make findable public keys representing user identities rather than financial transactions. Unlike the "certificate authority" system that is generally used for SSL-protected websites, this approach results in no potentially corruptible central authority. This is due to the globally distributed nature of a mesh network across many public key identity servers, which does not have a complex hierarchy of trusted signatures that make for such poor usability in the PRETTY GOOD PRIVACY (PGP) system. Because the present last closed ledger for finding public keys uses an append-only ledger, revoking compromised keys only requires adding a new entry into the ledger. Each system server ledger can be searched from the leading edge backwards, such that the most recent key for any identity will always be found first (with links back to previous keys for accurate history).

Using this last closed ledger protocol or approach across all of the public key identity servers, these servers can then form a mesh network. As such, any identity on the entire system can be looked up by a user on any one of the identity servers in the network, such as, for example, whichever server is closest or most efficient for the user. In the event that the public key that is desired is not on the local or currently-used identity server, then a request is sent from that server across the mesh network of identity servers for that particular public key. Each identity server getting that request can then search its own local ledger from the leading edge backwards. Upon finding the public key at issue, another server can then communicate that key to the currently-used identity server for use in a particular transaction. Such public keys can also be communicated to one or more link contract servers, as may be appropriate for some embodiments.

Accordingly, the present disclosure contemplates an electronic marketplace system that utilizes: (1) a specific JLINC protocol or other open source protocol, and (2) a network of JLINC servers, which can include one or more link contract transaction servers as well as a plurality of public key identity servers. An exemplary transaction on the overall system can involve two parties looking up the public keys of each other on the JLINC identity server mesh network, and also using the JLINC protocol and the network of JLINC servers to agree to and digitally sign a link contract prior to transferring, porting, or otherwise transmitting requested data therebetween.

Such a system allows for a more protected moving or porting of user data from one network or server to another. This can be done in order to make known to vendors, providers, and/or other system users the possible purchase interests, desires, or other inquiries of a given user in a way that does not compromise the control of their own protected data for a given user. This also can be done while still assuring the vendor or other provider that the user is a qualified customer, and permitting the vendor to contact the user with more relevant information and offers. Finally, this can also allow the user to withdraw from being contactable or having his or her data used when he or she is no longer interested.

In various embodiments, the overall system also allows for search abilities for other users across disparate social networks, without compromising the control of data for each user thereon. Such search capabilities may be contained on one or more link contract servers, and/or on one or more other system servers, such as a centralized informational or search friendly server.

In various embodiments, one or more link contract servers and/or one or more third party providers may allow for the copying, provision, or other use of standard link contracts. Such contracts can be provided to one or more link contract servers upon request, and/or can be kept at a third party provider server or website. Such third party providers may also provide a recording or repository service as an added benefit to users, vendors or other individuals who may desire added security or referencing abilities with respect to signed link contracts.

In various embodiments, one or more link contract servers and/or one or more third party providers may facilitate or allow for financial or informational escrow functionalities with respect to various signed link contracts. As such, funds or information can be held by an escrow provider and then forwarded or transferred once other agreed-upon conditions have been later fulfilled. Such provisions may also be part of a link contract, and a third party can be qualified as a neutral party to determine or verify when such additional conditions have been met prior to releasing the subject funds or information.

In various embodiments, one or more link contract servers and/or one or more third party providers may allow for the sale or provision of digital content in association with the link contract and associated provisions. Such items might include, for example, music, videos, movies, or other digital content, which may include indexes for the same. Such indexes might also include a standardized transaction service, which could take the place of a conventional search in various embodiments.

Figure 6:
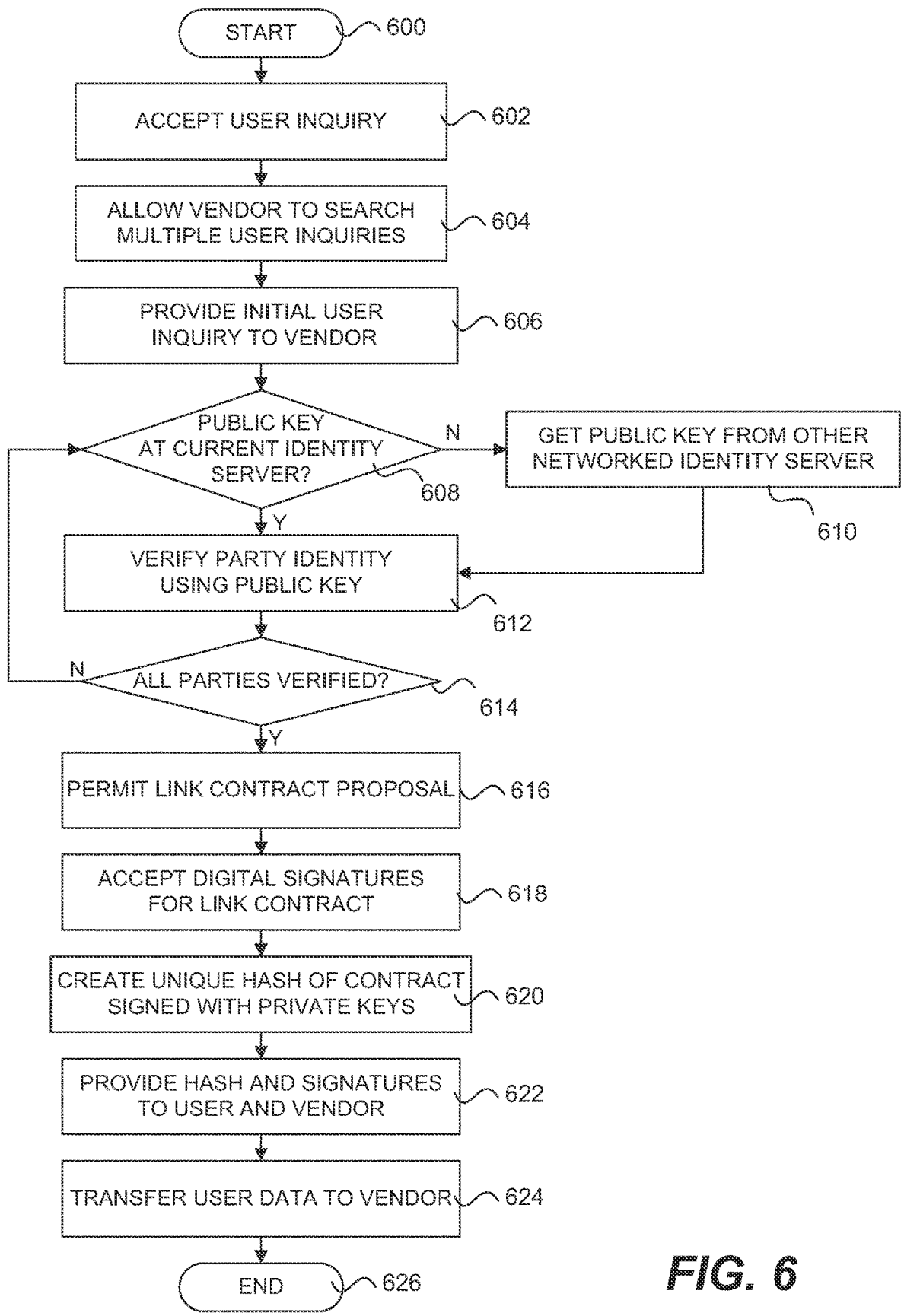
FIG. 6 illustrates a flowchart of an exemplary method of protecting a data transfer on a system distributed across disparate servers or networks according to one embodiment of the present disclosure.
Figure 7:
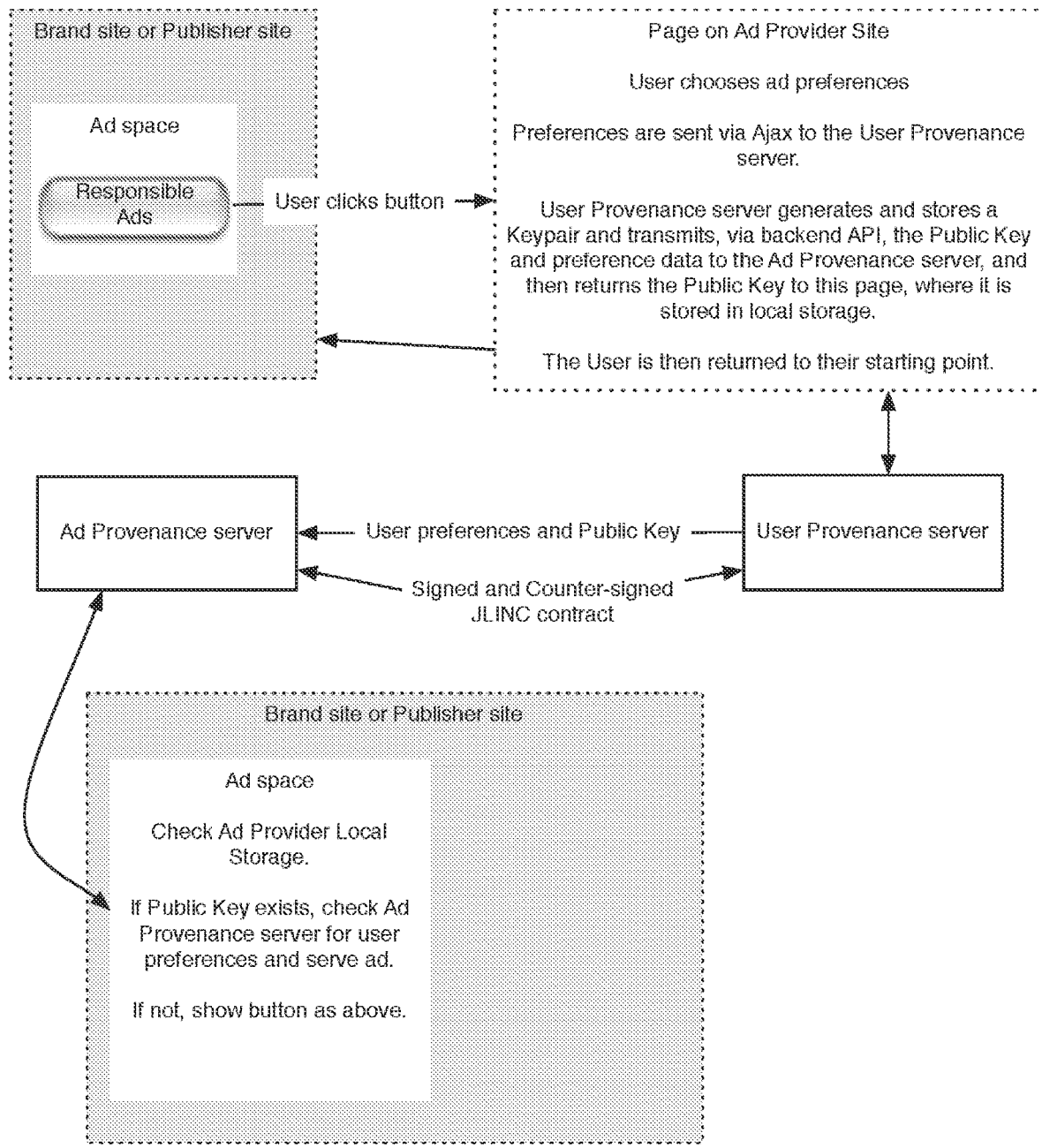
FIG. 7 depicts a diagram of the components required in the implementation and use of the method of the present invention as it relates to advertising.
Figure 8:
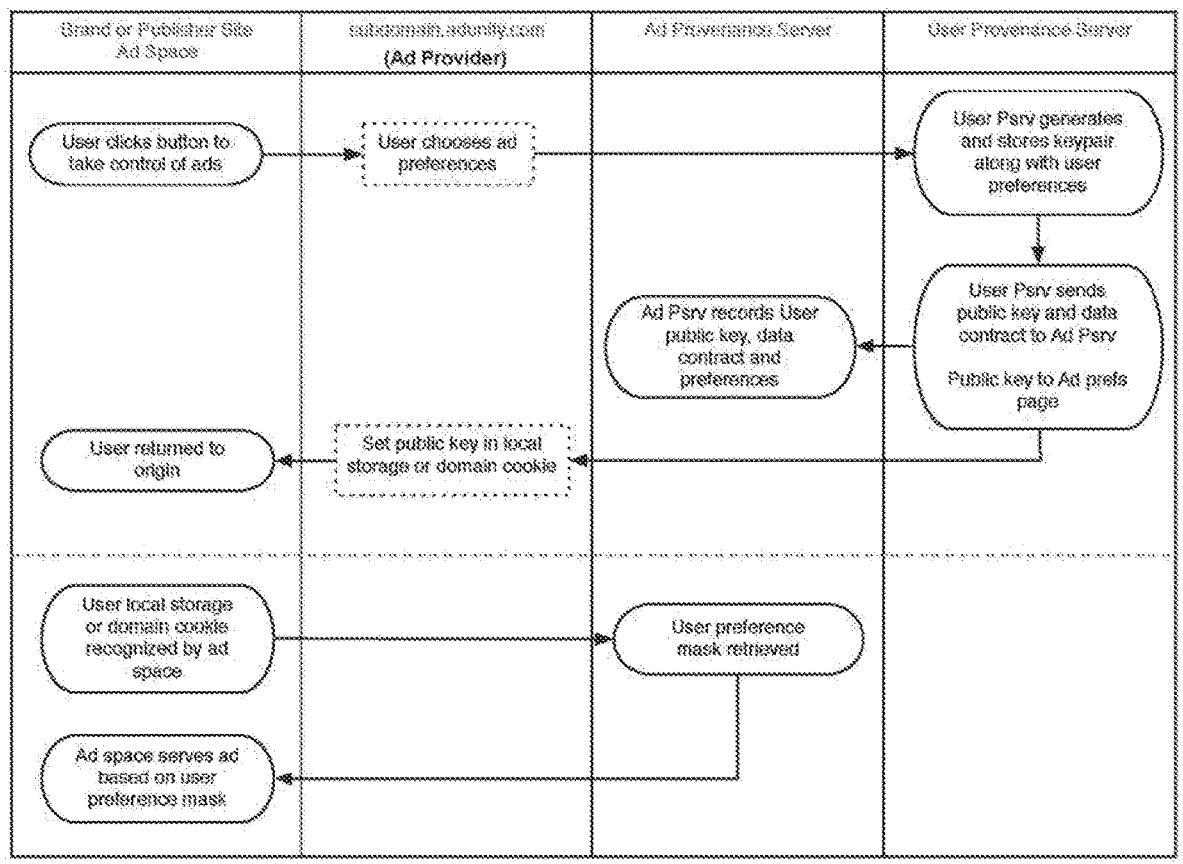
FIG. 8 shows a flow chart detailing the back-end processes enacted via the method of the present invention in order to facilitate seamless control over one's own internet data with respect to advertisements.

Moving to FIG. 6, a flowchart of an exemplary method of protecting a data transfer on a system distributed across disparate servers or networks is provided. As in the foregoing embodiments, such a distributed system may be, or may form or may include, an electronic marketplace system or other similar arrangement. Although the method illustrated here for purposes of illustration involves a user and a vendor, it will be readily appreciated that other types of users or parties may also be applicable. Furthermore, more than two parties may also participate in a given transaction or process. For example, multiple users, vendors, groups, businesses, or other entities may be involved in a similar method as set forth herein. It will be understood that all such suitable variations and/or additions may also be practiced in accordance with the present disclosure.

After a start step 600, a user inquiry can be accepted at a process step 602. Again, such a user inquiry can represent an intention-casting, such as where a user expresses a general or specific interest in a particular type of product, service, activity or the like. At a following process step 604, which may be optional, a vendor can be allowed to search through multiple user inquiries, which can contain the specific user inquiry accepted in step 602. Again, the present method could also involve the use of more than one user and/or more than one vendor, as well as other types of parties.

The user inquiry accepted in step 602 can then be provided to the vendor at process step 606, upon which the vendor may then choose to act upon this particular user inquiry. A party identification verification process may determine the actual identities of the user and the vendor. This verification process begins at decision step 608, where an inquiry is made as to whether a public key for the party (e.g., user or vendor) being identified is at a currently accessed public key identity server. If the key is there, then the method proceeds to process step 612. If the public key for the party at issue is not at the current public key identity server, however, then the method moves to process step 610, where the public key for the party at issue is retrieved from another public key identity server that is within a mesh network of identity servers for the present electronic marketplace system. The party at issue is then verified at the currently-accessed public key identity server using its public key at process step 612. An inquiry is then made at a following decision step 614 as to whether all parties have been verified in this manner. If not, then the method reverts to step 608 for the next party to be verified. Once all parties have been verified using their public keys the method moves to process step 616. At process step 616 a link contract proposal can be made from one party to the other(s). Such a link contract can be a standard, partially standard, or customized contract proposing the terms under which the data transfer or porting is to be made. Again, such terms can involve what exactly can be done with the data to be transferred, which data can be protected data of the user, vendor, or both, and so forth. These terms can be negotiated and/or adjusted between the parties if desired, after which digital signatures for the link contract can be accepted at a subsequent process step 618. Again, the digital signatures can include the use of the private key of each party, so as to provide proof that each party has agreed to the specific link contract at issue. A unique hash of the contract signed with the private keys of all parties can be created at process step 620, after which this unique hash and the signatures can be provided to all parties (e.g., the user and vendor) at process step 622. From a practical perspective, the hash of the contract signed with the private keys may simply be a cryptographic hash of a proposed contract that has cryptographic signatures of the parties added to it to form a cryptographically-signed hash The data can then be transferred at subsequent process step 624. Again, such data can be personal data and/or other protected data of the user, the use of which is restricted as specified by the digitally signed linked contract. The method then ends at end step 626.

For the foregoing flowchart, it will be readily appreciated that not every method step provided is always necessary, and that further steps not set forth herein may also be included. For example, added steps to involve additional parties such as more vendors may be added, and the use of third party sites or escrow services may be added. Also, steps that provide more detail with respect to the link contract formation can also be included, such as, for example, the addition of pointers to other locations for contract provisions or terms, as well as the changing of terms. Furthermore, the exact order of steps may be altered as desired, and some steps may be performed simultaneously. For example, steps 608 through 614 may be performed before, after, or simultaneously with steps 602-606 in various embodiments. As another example, steps 618 and 620 can be performed simultaneously in some situations.

The present invention is also a system and method by which data may be easily defined, mapped, and transferred among databases while permitted, and only when permitted. Permissions are negotiated via cryptographically signed Information Sharing Agreements (ISAs), which are legally binding. The agreements ensure that data obtained is only used for purposes which is it permitted to be used for, and that data is only transferred to other parties when permitted. The system and method of the present invention employs JSON-LD, a data graph language by which administrators may define data transferal and then adds a new layer by which owners may define and agree to permissions associated with the data.

For example, say a user is interested in purchasing a car. The user discloses to a vendor, via an Information Sharing Agreement (ISA), that he or she is interested in a vehicle today. The data is related to the intent or interest of the user in a vehicle. The user may later request the data to be returned or destroyed. This is of high value to both the user and the vendor. They are required to abide by the interest of the user, but it is in their interest as well to protect their reputation. The vendor does not have much to gain from stealing that data. Instead, by honoring the agreement, the reputation of the company is maintained and developed. Once the company fully embraces the new system it also benefits from better quality data at vastly reduced data maintenance cost, allowing more sales resources to be focused on serious buyers rather than wasting effort antagonizing currently uninterested customers, who recently bought a car for example.

The system and method of the present invention may also be applied to the web advertising space, wherein a user may set his/her preferences across a network of publishers, and be served ads that conforms to their interests while remaining essentially anonymous to the advertisers, and without being tracked the way that conventional ad tracking works.

The system of the present invention may be used for both credentialed users of a website, or for those that are not (or not yet) a user of the site. In such scenarios, the non-logged in user viewing a site may tailor his or her ad experience (and in turn, qualify usage of his or her anonymous user data), allowing the user to view a site with the ad option, without having to disclose their actual identity, and without having to log-in. As such, the present invention enables users to remain anonymous, but to also have ads that are customized to them.

The system of the present invention is architected with a data graph language, such as JSON-LD, an open software protocol gaining prominence in use on the Internet. JSON-LD is a new graph language. The system, referenced as JLINC, is expressed in this graph language, and adds cryptographically signed contracts and usage control, which is also written in the graph language. The system of the present invention is architected in this fashion in order to split or separate the end points of the data exchange—namely, between two adversarial entities. This "Separation of Concerns" concept is important to the essence of the present invention, which helps expand the scale and scope of the system of the present invention to include not only the use/exchange of data, but to other online contracts and agreements as well. The audit trail of the contract that is completed is held by a fourth party, and a third party could supply a standard contract, or be a verified attribute provider (such as verification of age/location/etc.) This separation facilitated by the present invention allows for a protocol base for this on the Internet.

It should be understood that the sharing of user data among entities is especially relevant with respect to advertisements. Companies wish to advertise to users who have an interest in their product or service. Corollary companies or those which provide goods or services similar to those of other companies often wish to exchange user data for mutual benefit. As such, much of the exchange of user data pertains to advertising. The system of the present invention includes a robust web application and desktop application, which interface with websites of these entities, to enable users to set broad permissions pertaining to their interests and user data preferences which are enacted globally to all entities (ad publishers to domains, as well as the companies of the domains themselves) equipped with the data access control system of the present invention.

The following terms are to be defined as follows as they pertain to the process and use of the system and method of the present invention:

Publisher: a content provider, which hosts ads on a website at a domain that it controls.

User: the individual consumer of content and ads via a web browser.

Ad Network: ad content provider contracting with the Publisher to deliver ads to the User.

Ad Preferences: a set of specific choices made by the User in response to a set of options presented, these could include what types of ads, in what interest area, from whom, etc.

ADprefs: a JLINC enabled domain where a User can set and manage their Ad Preferences.

Figure 9:
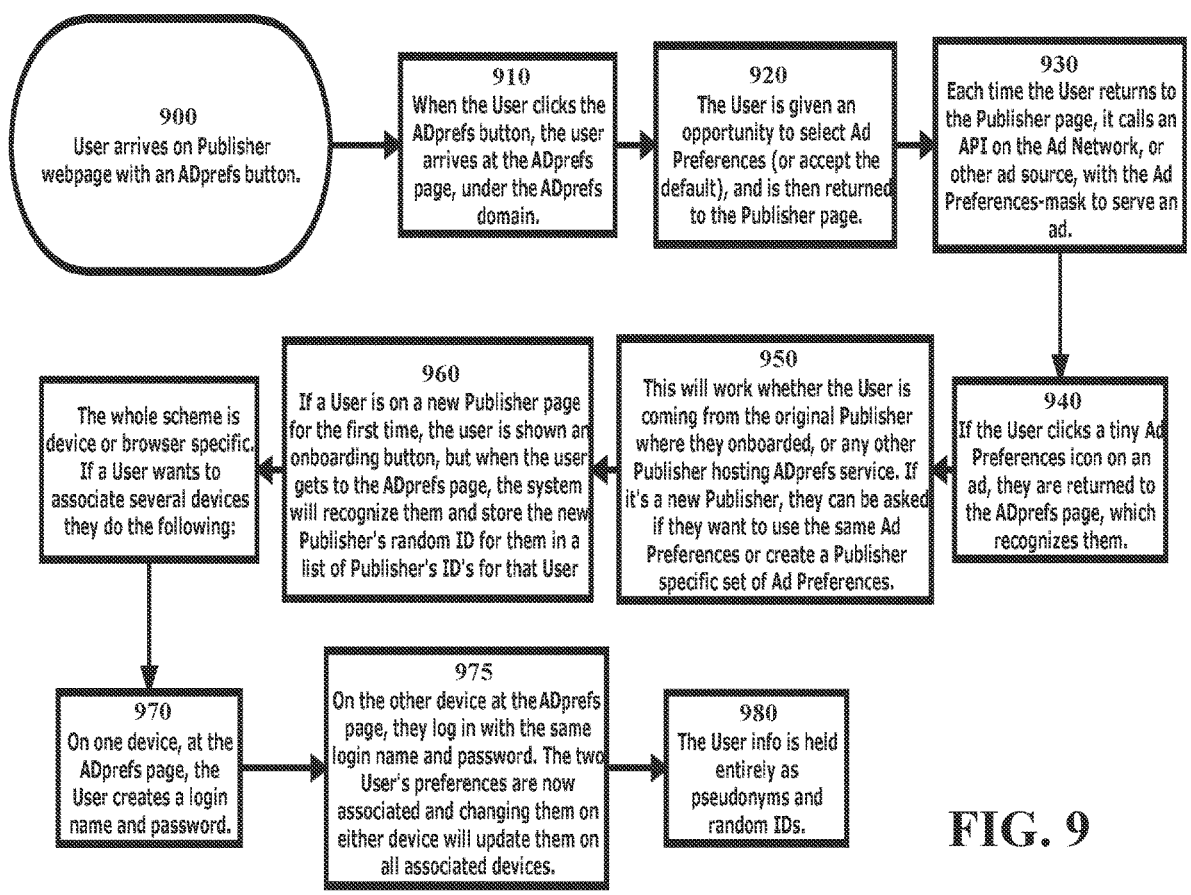
FIG. 9 details a flow chart showing the implementation and automated use of the system and method of the present invention.

The process of implementation and automated use of the system and method of the present invention, as shown in FIG. 9, is preferably enacted as follows:
1. User arrives on Publisher webpage with an ADprefs button. (900)
2. When the User clicks the ADprefs button, the user arrives at the ADprefs page, under the ADprefs domain. (910)
3. The User is given an opportunity to select Ad Preferences (or accept the default), and is then returned to the Publisher page. (920)
4. Each time the User returns to the Publisher page, it calls an Application Programming Interface (API) on the Ad Network, or other ad source, with the Ad Preferences-mask to serve an ad. (930)
5. If the User clicks a tiny Ad Preferences icon on an ad, they are returned to the ADprefs page, which recognizes them. (940) This will work whether the User is coming from the original Publisher where they onboarded, or any other Publisher hosting ADprefs service. If it's a new Publisher, they can be asked if they want to use the same Ad Preferences or create a Publisher specific set of Ad Preferences. (950)
6. After first onboarding, if a User is on a new Publisher page for the first time, the user is shown an onboarding button, but when the user gets to the ADprefs page, the system will recognize them and store the new Publisher's random ID for that User in a list of Publisher's IDs. (960)
7. The whole scheme is device or browser specific. If a User wants to associate several devices they do the following:
   a. On one device, at the ADprefs page, the User creates a login name and password. (970)
   b. On the other device at the ADprefs page, they log in with the same login name and password. The two User's preferences are now associated and changing them on either device will update them on all associated devices. (975)
8. Note, neither Ad Network nor ADprefs is collecting any PII, and so by definition they are not sharing or selling any Personally Identifiable Information (PII). The User info is held entirely as pseudonyms and random identifications or identifiers (IDs). (980)

Figure 10:
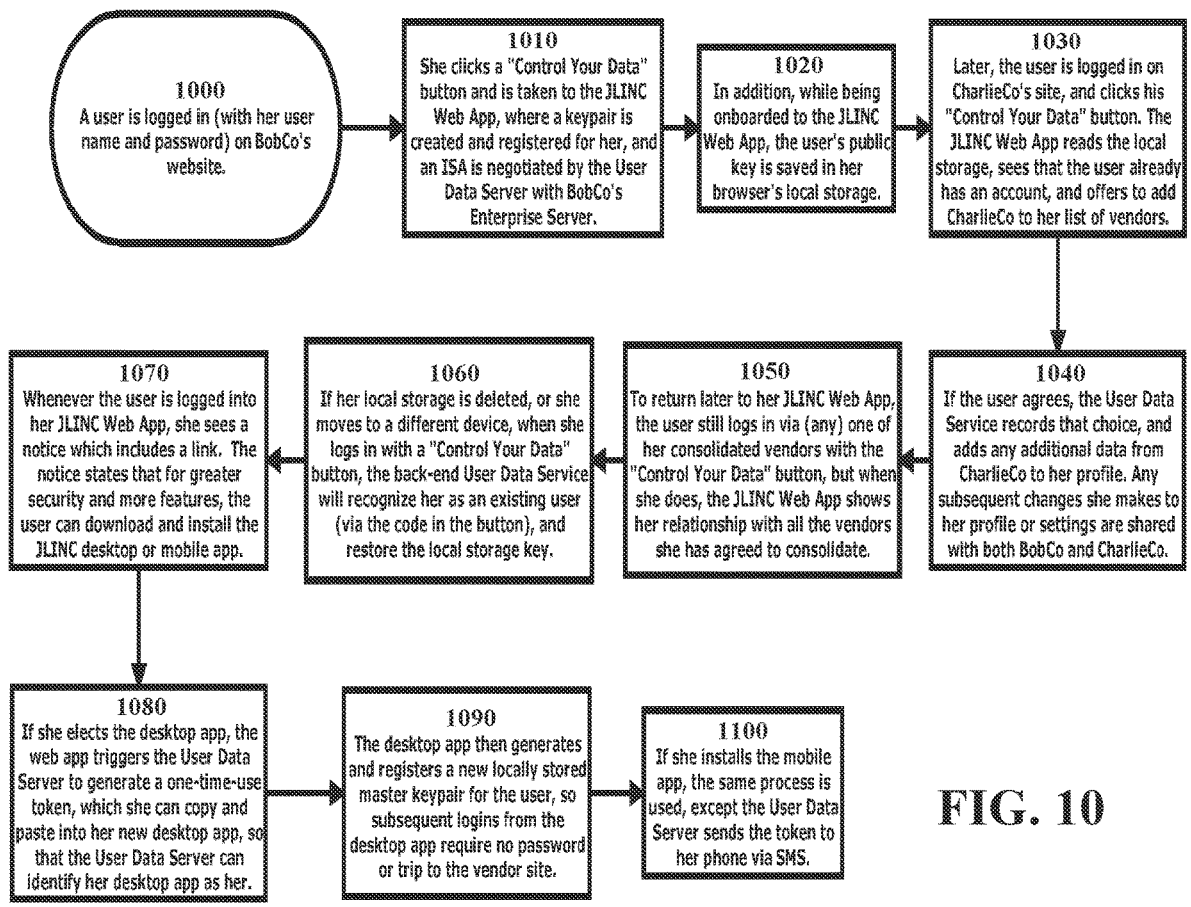
FIG. 10 exhibits a flow chart depicting the method steps of the present invention, showing the progression of internet data as permission is inquired and acquired with respect to advertisements.

An example of an end user employing the JLINC system and interface of the present invention to control his or her advertising permissions and data usage is exemplified, as shown in FIG. 10, is as follows:

A user is logged in (with her username and password) on BobCo's website. (1000)

She clicks a "Control Your Data" button and is taken to the JLINC Web App, where a keypair is created and registered for her, and an ISA is negotiated by the User Data Server with BobCo's Enterprise Server. (1010)

In addition, while being onboarded to the JLINC Web App, the user's public key is saved in her browser's local storage. (1020) It could also be saved in a cookie, however presently the present invention does not require any cookies and so therefore, the system does not require a cookie notice. Some browsers set in their default settings that when a site wants to write to local storage for the first time, the browser puts up a permission box for the user to check OK.

Later, the user is logged in on CharlieCo's site, and clicks his "Control Your Data" button. The JLINC Web App reads the local storage, sees that the user already has an account, and offers to add CharlieCo to her list of vendors. (1030)

If the user agrees, the User Data Service records that choice, and adds any additional data from CharlieCo to her profile. Any subsequent changes she makes to her profile or settings are shared with both BobCo and CharlieCo. (1040)

To return later to her JLINC Web App, the user still logs in via (any) one of her consolidated vendors with the "Control Your Data" button, but when she does, the JLINC Web App shows her relationship with all the vendors she has agreed to consolidate. (1050)

If her local storage is deleted, or she moves to a different device, when she logs in with a "Control Your Data" button, the back-end User Data Service will recognize her as an existing user (via the code in the button), and restore the local storage key. (1060)

Whenever the user is logged into her JLINC Web App, she sees a notice, which includes a link. The notice states that for greater security and more features, the user can download and install the JLINC desktop or mobile app. (1070)

If she elects the desktop app, the web app triggers the User Data Server to generate a one-time-use token, which she can copy and paste into her new desktop app, so that the User Data Server can identify her desktop app as her. (1080)

The desktop app then generates and registers a new locally stored master keypair for the user, so subsequent logins from the desktop app require no password or trip to the vendor site. (1090)

If she installs the mobile app, the same process is used, except the User Data Server sends the token to her phone via SMS. (1100)

Security Considerations

The web app of the present invention is only as secure as the logins for BobCo and CharlieCo. This is exactly the same situation as with OAuth, i.e. if a user logs into all used sites with FACEBOOK, and someone compromises the user's FACEBOOK account, they have access to all of the user's data.

Unfortunately, SMS as a second authentication factor is not as useful as it may seem.

Essentially, if a malicious actor can hijack the user's phone account (which can be done), they own the user's Short Message/Messaging Service (SMS) and likely the user's email as well. In such cases, the present invention encourages the use of YUBIKEY devices (or similar) for security. It is predicted that eventually everyone will have two YUBIKEY devices—one easily accessible, and one hidden away in the event that the first is lost or stolen.

A large number of variations may be present in the use of the system and method of the present invention. The previous description of the system focused primarily on volunteered personal data use cases. As previously noted, the system also includes use cases pertaining to advertising. It is envisioned that the system of the present invention also provides technical solutions to mandated compliance under PSD2 open banking rules or Know Your Customer rules, as well as GDPR requirements for personal data control and portability. It is envisioned that the system of the present invention may be employed with PSD2 APIs, in a manner which will allow a FinTech company to fulfill GDPR, with compliance handled via the system of the present invention. Presently, PSD2 requires banks to open an API, but then when the user gives a FinTech third party company that API access, there is presently no way for that FinTech company to fulfill the GDPR requirements for personal data control. With JLINC, a FinTech provider can leverage the opportunity to expand into new business offered by PSD2, while also providing their customers granular control over his/her data required to comply with GDPR.

The system of the present invention may also be used for identity verification. For example, proof of identity, such as age or location/zip, is often required by some businesses which sell age-restricted items and services. In such domains, the system may be used to confirm that the user is indeed X years old, or is confirmed as physically in a certain location, and then the data may be shared according to this confirmed and legally obtained data.

Similarly, the system may be configured such that a third party counter-signs with a key, such as something like a hard identity qualification, including stating that the user is over 18, or saying that this is the child of the person as evidenced by this token, all without knowing the identity of the person. As such, the system can be used for child-proofing space for domains, even for anonymous users.

It should be understood that the systems and methods of the present invention need not be restricted to use in advertising, but instead extend to any and all agreements to be made securely by one or more parties over the Internet. While JSON-LD is employed as a graph language, it should be understood that other graph languages may be used in lieu of JSON-LD.

For example, it should be understood that another key advantage of the current invention is that it provides a mechanism for delegated consent, whereby one party may give consent for use of data, which may be shared by a second party under the authority of the first party, with additional third or fourth parties, etc. The conditions may be automated, and may be set by the first party contingent on conditions which must be satisfied by the additional parties, and could also be combined with other conditions in a logical or Boolean manifold. For example, continue to share this data with car dealers that have inventory in a certain model, in a certain color, up until a specified date, or until notice is transmitted that the first party has completed a purchase and is no longer in the market. No party may retain the data or retransmit the data upon receipt of an instruction from the first party to delete it.

Such automated logical contractual hierarchies are not limited to business-to-consumer use case scenarios, but can also be employed in any commercial contract or supply chain, such as for example one where a potential customer places an open order for information, or to actually execute an automated purchase, based on the vendor meeting specified terms for the product specification, delivery date, financing terms, etc. The commercial contract could include pure financial instruments and trades in commodities, derivatives or other financial instruments or products.

It should be understood that an alternative commodity backed trade credit could be established using the current invention where machine-readable contracts backed by one or more commodities are exchanged as trade credits. These credits serve as an inflation-resistant unit of exchange where liquidity is provided by the capability to express the units in contracts, which are both human and machine readable and can be inspected by a judge (unlike other previous blockchain-based contracts).

Similarly, it should be understood that a mutual-credit trade credit system could be established using the current invention wherein individuals and/or entities can extend credit to each other in the form of tradable IOUs. These tradable contracts constitute a method of creating liquidity among a network or community. The ability to automate contractual exchange and to associate identity with attributes which can be expressed as keys, which are in turn used to countersign the keys used to sign trade credit contracts, allows the present invention to provide the necessary missing infrastructure for a working community credit system.

Other versions include scenarios involving the Internet of Things (IoT), whereby a device creates data about, and/or on behalf of, an individual, or other entity, where the device signs the data before it is transmitted, and the use of that data is governed under an ISA between the individual or entity that uses the device and an entity that receives the data.

In another class of embodiments, data may be exchanged between two or more commercial entities in a business relationship where the contract governing the data is a complex legal document that has been negotiated between their respective legal departments to govern the exchange of particular data between their respective databases under specific terms and conditions on an automated basis possibly triggered by internal or external events, and/or by time cycle events.

In another class of embodiments, the chain of data provenance created by a sequence of commercial parties, each signing an ISA associated with the movement and processing of goods through a supply chain, may be used to help govern that supply chain. Here, the data provenance represents and verifies the physical chain of custody, or provenance, associated with the sequence of activity in a material supply chain. The cryptographically signed and verified documentation proving origin of raw materials or food inputs, and therefore the integrity of that supply chain, may also add value for the end user, or consumer, of the resulting product.

In another preferred class of embodiments, the protocol and system of the present invention may be used for three-party interactions, as detailed below.

The JLINC protocol of the present invention enables a more secure and flexible solution that addresses the requirements of both PSD2 and GDPR. The following is a description of the JLINC protocol as it applies to a three-party interaction:

The three actors involved in the system and implementation of the present invention, and their interacting cloud services, per an example interaction, are as follows:
 The Bank, referenced as BankCo.
 The bank's agent, the BankCo JLINC Solutions Service.
 The Financial Technology company, referenced as FinCo.
 The Financial Technology company's agent, the FinCo JLINC Solutions Service.
 The end-user, the "data subject" in GDPR terms, or "resource owner" in OAuth terms, referenced as Alice.

Her agent is the JLINC Data Service, which she accesses via her JLINC App.

Figure 11:
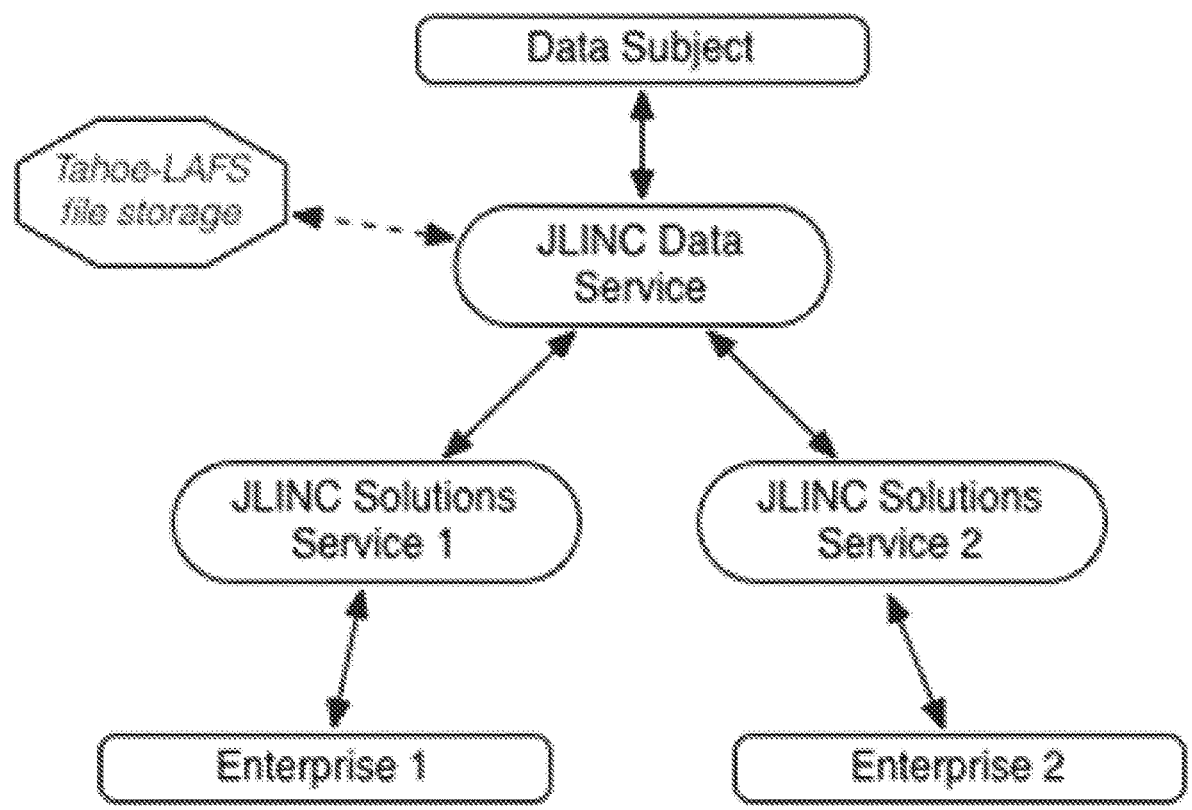
FIG. 11 depicts a flow chart showing the interaction between three parties and the JLINC Data Service of the present invention.
Figure 12:
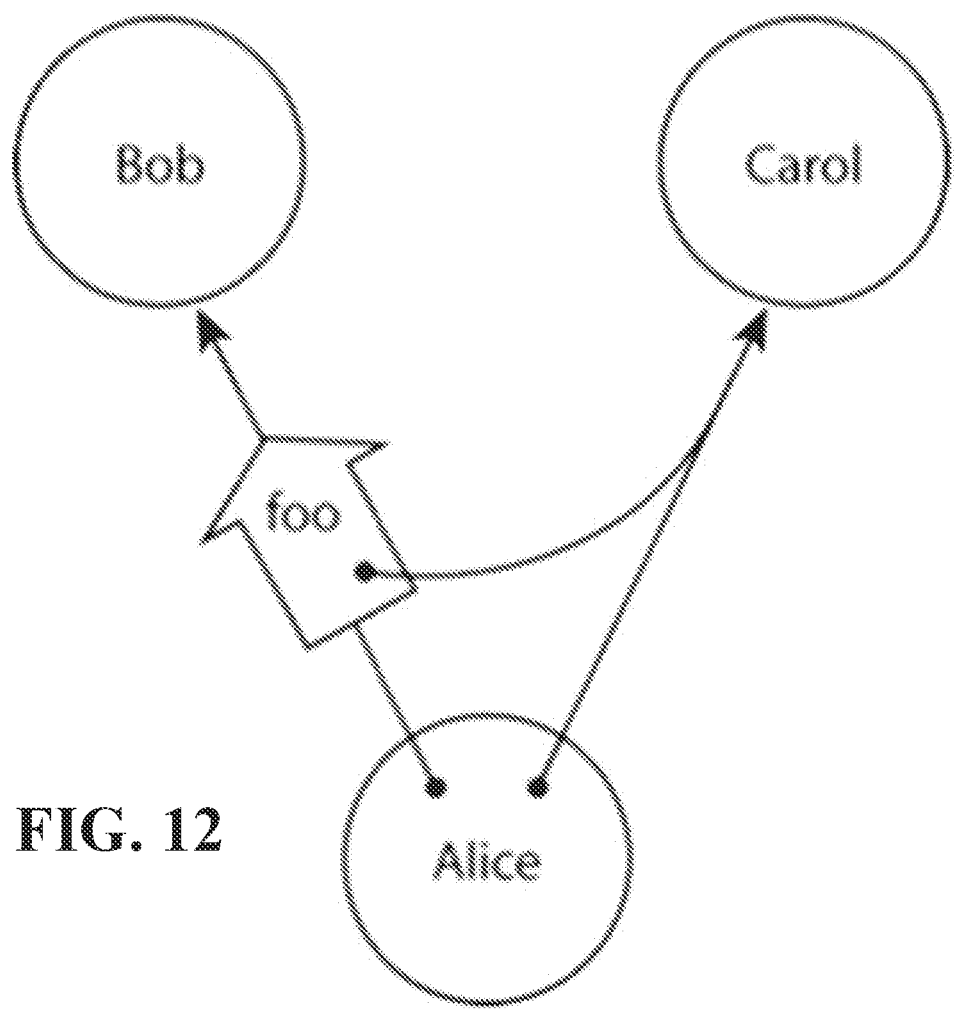
FIG. 12 is prior art from Miller.

The interaction of the three parties can be seen in FIG. 11.

Alice can be initially onboarded to the system of the present invention (JLINC) via either BankCo or FinCo. For this discussion example, it is assumed she is being onboarded by BankCo, but the process is the identical, regardless of how Alice is onboarded to the system.

BankCo initializes each existing or new customer on its JLINC Solutions Service by sending the customer's account number or other ID that uniquely identifies the customer in the bank's records to the appropriate JLINC Solutions Service API. Then, the process is as follows:
1. JLINC Solutions Service contacts Alice's JLINC Data Service, which instantiates a key pair for this user (Alice) and sends the public key back to the JLINC Solutions Service as a pseudonymous identifier along with a proposed Information Sharing Agreement signed by Alice's private key.
2. The JLINC Solutions Service records the public key, counter-signs the Information Sharing Agreement, and returns it to Alice's JLINC Data Service. Both services can record this agreement with a third-party audit service as well. JLINC Solutions Service also at this time creates a one-time random ID and uses that ID to make a one-time-use Uniform Resource Locator (URL) that BankCo can present to Alice to bring her onboard.
3. The JLINC Solutions Service may also return along with the signed Information Sharing Agreement some data which the bank wishes to share and/or co-manage with Alice, which she can change, update, or withdraw at any time in accordance with the Information Sharing Agreement.
4. When Alice accesses the URL, she is brought to the JLINC Data Service login page. When she logs in, the new pseudonym is associated with her account. If she does not yet have an account, she can register a new account, and the pseudonym is then associated with her new account.

Alice can add a FinCo account to her JLINC Data Service by selecting it in her JLINC app. The process works similarly to the above, except in reverse. This process is preferably as follows:
1. First, the JLINC Data Service generates a new key pair for Alice, and sends the public key to the FinCo JLINC Solutions Service with a signed proposed Information Sharing Agreement.
2. The FinCo JLINC Solutions Service counter-signs the Information Sharing Agreement and returns it to the JLINC Data Service. It messages the FinCo API to create a new customer record and records the new customer ID.
3. FinCo can then request data from Alice's JLINC Data Service. Alice will have pre-authorized a certain profile or data set when she initiated the FinCo account request, which she can change, update, or withdraw at any time. The data that has been authorized by Alice to share may include BankCo data that Alice has received from BankCo according to the Information Sharing Agreement.

The list of available JLINC Solutions Services that Alice can choose to add to her JLINC Data Service is created and maintained by an out-of-band registration process that establishes a unique API key and API secret shared between that JLINC Solutions Service and her JLINC Data Service.

All communications between the respective services are conducted over encrypted sessions (generally TRANSPORT LAYER SECURITY (TLS)), but for further security two other measures are required.

First, all messages include the sender's API key, and are formatted as JSON Web Tokens protected by a KEYED-HASH MESSAGE AUTHENTICATION CODE or HASH-BASED MESSAGE AUTHENTICATION CODE (either called HMAC) section using the shared API secret, thus mitigating a man-in-the-middle attacker from altering the message in transit between the services without detection.

Additionally, the contents of the message are encrypted with the intended recipient's public key for that relationship. Thus only the possessor of Alice's corresponding private key can read the contents of the message, and any attempt to alter the message contents will fail.

PSD2 Services

To implement PSD2 services, FinCo needs to access BankCo's PSD2-required APIs on Alice's behalf. The method for enabling this currently under consideration by relevant standards bodies is an OAuth2 framework. The preferred steps of this method are as follows:
1. First, the present invention employs an extension to OAuth2 to allow Alice and/or her JLINC Data Service to authenticate at BankCo with a key challenge rather than a username and password. It will work as follows.
2. Alice indicates to FinCo (either logged in at the FinCo site, or by pre-arrangement), that she wishes FinCo to perform some action involving BankCo on her behalf.
3. Then, under an existing ISA (a hash of the ISA is included in the request), FinCo's JLINC Solutions Services calls an API at Alice's JLINC Data Service to request a capability from BankCo.
4. Next, Alice's JLINC Data Service in turn makes an API call to BankCo's JLINC Solutions Service for the capability, including a hash of Alice's ISA with BankCo.
5. Next, BankCo's JLINC Solutions Service presents Alice's public key to BankCo's authentication API in lieu of a username.
6. Next, BankCo returns an authentication challenge, a random number or string. Crucial to the security of this step, the challenge must be of sufficient length and sufficiently random, and must never be reused. BankCo's JLINC Solutions Service preferably includes a check to prevent challenge reuse.
7. Then, BankCo's JLINC Solutions Service encrypts the challenge with Alice's public key and sends it to her JLINC Data Service. Her JLINC Data Service decrypts the challenge, signs it with Alice's private key, re-encrypts the signed challenge with BankCo's public key, and sends it back.
8. Then, BankCo's JLINC Solutions Service decrypts the signed challenge with BankCo's private key if BankCo does not have the ability to do this itself and in any case presents the signed challenge to BankCo.
9. Next, BankCo verifies the signature with Alice's public key and then returns an OAuth token. This step is in lieu of the standard OAuth technique where Alice would have been redirected to and authenticated at BankCo's site, and then been redirected to FinCo with the OAuth token.
10. Then, BankCo's JLINC Solutions Service encrypts the token with Alice's public key and transmits it to Alice's JLINC Data Service. Alice's JLINC Data Service decrypts the token, re-encrypts it with FinCo's public key and transmits it to FinCo's JLINC Solutions Service.

11. Finally, FinCo's JLINC Solutions Service decrypts the token and presents it to FinCo to use as per the established OAuth framework.

At the conclusion of this process, the system of the present invention has presented a BankCo generated capability to FinCo, but has significantly mitigated the ability of a 'man-in-the-middle' attacker to replay the transaction, or to steal Alice's credentials or her OAuth token. By placing Alice at the center of the data event, the system of the present invention has given her visibility into, and control over, the entire process.

JLINC Solutions Service Connectors

An enterprise/business/entity may connect its data source (s) to a JLINC Solutions Service either with a direct CRM to JLINC Solutions Service database connector (for example the POSTGRE SQL (POSTGRES) database system's foreign data wrapper mechanism), or by using the JLINC Solutions Service API.

Onboarding New End-Users

An enterprise may initialize existing or new customers on its own JLINC Solutions Service in two ways. If the enterprise is using a direct CRM to JLINC Solutions Service database connector, then the JLINC Solutions Service database triggers the creation of a random one-time-use identifier. Otherwise the enterprise may send the customer's account number or other ID that uniquely identifies the customer in the enterprise's records to the appropriate JLINC Solutions Service API.

Then, in either case:

1. First, the JLINC Solutions Service of the present invention contacts the new end-user's JLINC Data Service, which instantiates a key pair for this user and sends the public key back to the JLINC Solutions Service as a pseudonymous identifier along with a proposed Information Sharing Agreement signed by the new end-user's private key.
2. Then, the JLINC Solutions Service records the public key, counter-signs the Information Sharing Agreement, and returns it to new end-user's JLINC Data Service. Both services can record this agreement with a third-party audit service as well. JLINC Solutions Service also at this time creates a one-time random ID, or uses the one created by the database trigger if that is the case, and uses that ID to make a one-time-use URL that BankCo can present to new end-user via email or other means to bring her onboard.
3. Then, the JLINC Solutions Service may also return along with the signed Information Sharing Agreement some data which the bank wishes to share and/or co-manage with new end-user, which she can change, update, or withdraw at any time in accordance with the Information Sharing Agreement.
4. When the new end-user accesses the URL, she is brought to the JLINC Data Service login page. When she logs in, the new pseudonym is associated with her account. If she does not yet have an account she can register one, and the pseudonym is then associated with her new account.

JLINC Audit Service

As part of the JLINC protocol of the present invention, all parties to any data event may each specify a JLINC Audit Service. The protocol requires that each party so notified transmit, within a reasonable period of time, a copy of the signed data event receipt that was created as part of the data event to the specified JLINC Audit Service.

The JLINC Audit Service matches receipts, and issues a notification to all parties involved if, after a period of time, it has not received matching receipts from both or all parties to the data event in question. These receipts are designed to offer cryptographically non-refutable proof that the parties agreed to the data exchange in question.

The JLINC Audit Service of the present invention also provides a key-registration service that registers public keys for all parties that use the service. In the event that a corresponding private key is compromised or withdrawn from service for any reason, the JLINC Audit Service records that fact, along with a public key that has superseded the invalid one if applicable. If a receipt is received by the JLINC Audit Service containing an invalid public key, the service returns a notice to that effect, along with any information about superseding keys. The JLINC Audit Service also provides an API to check public keys for validity and supersession directly.

Following is a non-exhaustive description of some of the uses made possible with JLINC. The following terms apply throughout:

SISA: a standard information sharing agreement.
SISA Event: a software defined object that both carries data and a reference to the
SISA under which the data is being shared, and provides an auditable record of the data sharing and the SISA context under which it took place.
DID: a decentralized identifier which can be dereferenced to a public key used to verify the authenticity of an actor in the system.
VC: a verified credential establishing the real world identity of an actor in the system, or some other attribute if specified.
Agent: a software program that operates under the control of and with fiduciary obligation to an entity, and represents and facilitates interactions with other entities via their agents.

Use Cases:

1. News articles and social media postings with verifiable provenance.
   a. The original author or authors is identified with a DID, and optionally a VC, and the article is assigned a globally unique identifier.
   b. The SISA requires each publisher to have a VC and a DID.
   c. A chain of provenance accompanies the article, showing the DID of the author and the DID and VC of each publisher or re-publisher in sequence, along with the article's original identifier.
   d. The SISA requires the author and each publisher and re-publisher to sign the provenance chain with the private key that can be verified with the signing key indicated by their DID, and to make the chain and signatures available with the article.
2. Usage control over personally identifying information (P
   a. An individual wishing to share PII with a merchant or supplier of services causes their agent to create a new DID for that purpose.
   b. Their agent then signs a selected SISA and offers it to the supplier's agent for co-signing, or alternatively the supplier choses and signs a SISA and the individual's agent co-signs it if acceptable.

c. Either way, both parties wind up with a signed and co-signed SISA that will govern their data sharing, and data can then be safely shared via SISA Events.
3. Public pledge signing.
   a. A party identified by a DID and other identity information can publish a pledge, optionally including a SISA.
   b. Another party, also identified by a DID, can sign the pledge and the SISA, which if present governs how the fact that and the identity of the second party who signed the pledge can be used or made public.
4. Contract signing.
   a. Two or more parties, each identified by a DID, can sign or co-sign a contract.
   b. The contract may contain a SISA, or be accompanied by a SISA.
   c. The fact of signing by each party generates a SISA Event which provides an audit record and non-repudiation.
5. Capabilities for 3rd party sharing with usage and provenance control.
   a. An individual or other entity wishes to give conditional access to one party (for example a financial technology provider) to the entity's account at another party (for example a bank). This can provide a more secure and flexible arrangement for standards such as the Open Banking Initiative or the European PSD2.
   b. It is not limited to financial exchanges, however. Any exchange where a controlling party wishes to grant partial and conditional access to a second party by third parties is germane.
   c. For the purposes of explication, we will refer to these entities below as Alice (the individual), the Fintech and the Bank.
   d. The Fintech signs a SISA with its DID specifying which access it needs and the limitations and obligations it accepts and transmits it to Alice's agent as a SISA Event.
   e. If Alice concurs, she co-signs the SISA and returns it to the Fintech as a SISA Event sequenced to the original. It is now a Capability.
   f. The Fintech proffers the Capability to the Bank. The Bank checks the signatures and also verifies the existence of the SISA events with Alice's agent. If all is correct the Bank engages with the Fintech on Alice's behalf according to the limitations and instructions of the SISA.
   g. Each interaction between the Bank and the Fintech generates another SISA event, providing a chain of auditable records available to Alice.
   h. The SISA may provide a notice of which data the Bank may share, which data the Fintech may modify or insert, Alice's rights to time-limit or withdraw the validity of the Capability, and the fiduciary obligations of each party, as well as any other desired requirements.
6. Notaries Public.
   a. A notary public may register with a JLINC service and receive a DID.
   b. A member of the public who also is registered with a JLINC service brings some document which they wish to be notarized.
   c. The customer opens their JLINC app, selects a menu item that generates a QUICK RESPONSE (QR) code on the phone, and shows the QR code to the notary's app, verifying the customer's DID.
   d. The notary verifies the document and creates a VC signed by both the notary's agent and the customer's agent, memorialized as a SISA Event.
   e. The customer can then present the VC to a third party, which can verify the validity of the credential or document by verifying the signatures on the VC.
7. Verified Attributes.
   a. A government organization or private agency may register with or create a JLINC service and receive a DID.
   b. A member of the public who also is registered with a JLINC service applies to the agency to have attribute(s), knowledge or abilities certified.
   c. The applicant opens their JLINC app, selects a menu item that generates a QR code on the phone, and shows the QR code to the agency's app, verifying the applicant's DID.
   d. The agency makes the certification and then records it with their JLINC agent via their app and the respective JLINC agents use the JLINC protocol to create a mutually signed VC, memorialized as a SISA Event.
   e. The applicant can then present the VC to a third party, which can verify the validity of the certification by verifying the signatures on the VC.
   f. Optionally the applicant's JLINC agent may create one or more zero-knowledge proofs that provably assert some aspect of the certification without revealing any unnecessary details. For example, a ZERO-KNOWLEDGE PROOF (ZKP) might provably assert that the applicant is over 21 years of age, without revealing their actual birthdate.
8. Voting and Polling.
   a. A JLINC agent can create on behalf of a user a specialized voting DID. This DJD contains a service endpoint object of a type indicating usage for voting or polling.
   b. The JLINC agent creates one or more cryptographic hashes of attributes by which it authenticates this user (for example a mobile phone number) and adds them to the instances array of the voting service endpoint. These hashes are then used as unique identifiers by the user for the purpose of voting or polling.
   c. A JLINC agent which knows their user's voting DID and one or more of their authenticating attributes can rehash the authenticating attribute and present that hash and the DID to a voting or polling app to uniquely identify the voter without revealing any PII. This prevents double voting or other voting fraud.
9. Supply chain verification.
   a. Multiple parties, each with a JLINC agent, can sign SISA Events referencing VCs to verify the origins and movements along a supply chain.
10. Fiduciary agent for secure file storage.
    a. An entity's JLINC agent can interact with any capable secure digital file storage facility on behalf of the entity, under the entity's SISA with the agent.
11. Advertising preferences.
    a. The JLINC service has established relationships with various brands and/or media companies to provide advertising under a SISA agreement spelling out how revenue from the advertising is to be distributed, and under what circumstances any user data that is revealed may be used.

b. An end user has registered their preferences with their JLINC agent for what types of advertising they would like to see. They may update these at any time they wish.

c. In some applications they have also become a party to an advertising SISA contract protecting their privacy and usage of any data they provide.

d. The user accesses a publisher's site with a JLINC equipped browser (possibly an add-on application, i.e. a plugin), or via a JLINC portal application.

e. The publisher has made advertising space available, marked out in the display code as JLINC advertising space.

f. The JLINC application selects advertising filtered by the user's preferences and also possibly by the publisher's context, and fills the advertising space for the user's viewing.

g. The JLINC application records each ad's identifier and the user's and publisher's DIDs to create a SISA event that can be used for revenue distribution.

12. Group forming and group information sharing.

a. A JLINC service can facilitate the formation and operation of online groups by generating and managing DIDs for the group and each participant, and by tracking the provenance of each contribution to the stream of content offered to the group by its participants.

b. A participant in a group may be identified by their DID only and no PII, thereby creating a persistent pseudonymous identity.

c. The privacy and confidentiality of each participant is maintained by a SISA.

d. Socially validated identity arises from such an arrangement. Although each participant is known to the group only by their persistent pseudonym (a DID), over time the quality and nature of the content they provide to the group becomes associated with their DID.

e. A group may publish individual items of content, either publicly or privately to its network(s).

f. If the group desires PII from its participants, it can offer a SISS to protect its usage and confidentiality.

13. Network forming among groups, and information sharing and relationship graphs between groups in a network.

a. A JLINC service can facilitate the formation and operation of networks of online groups by generating and managing DIDs for the network and each group, and by managing the graph of relationships and SISAs between them.

b. Content originating from its member groups can be filtered and rated by the network, producing a stream of the highest quality content.

c. Each item of content is accompanied by a unique identifier as well as the DIDs of the originator and the group that published it and the network(s) that republished it, thereby maintaining the provenance of each item of content.

d. A group may belong to one or more networks, and networks may belong to one or more other networks.

e. Content can be republished and filtered and rated by each node in the relationship graph of networks and groups. The provenance of content is maintained by SISA Events that record and make auditable the chain of authorship and publishing/republishing.

f. Content can be republished via multiple paths in the graph and converged again by means of the provenance chains.

14. Coronavirus disease 2019 (COVID-19) testing and other medical data.

a. User arrives at a local testing station that offers a pulse-oximeter or other medical data testing on a JLINC enabled device.

b. The user opens their JLINC app, selects a menu item that generates a QR code on the phone, and shows the QR code to the testing device, verifying the user's DID.

c. The device signs a record of the test result(s) with its DID and the user's DID and sends it as a SISA Event to the users JLINC agent.

d. The user's JLINC agent keeps a time-series record of these tests which the user can reference, and also provides a VC of the time series that the user can choose to share with validated third parties via a medical SISA.

15. A microcredit payment system.

a. A SISA can be crafted to serve as a financial instrument by describing an agreement to pay from a prepaid account or digital wallet, or to accrue a credit to one party and a debit to the other, each time a SISA Event occurs under that SISA.

b. SISA Events are extremely compact but cryptographically verifiable records that can be stored by each participating party, and on any mutually agreed audit ledger(s), at almost infinitesimal expense. They are well suited to facilitate a micropayment or microcredit system in a novel way, providing cryptographic security, verifiability, and non-repudiation to payment contracts at a small enough cost that tiny transactions become practical. These transactions might include for example payment for reading an article, listening to an audio recording, or watching a video recording.

c. At the end of an agreed period, upon a total accrued value being reached, or other mutually agreed event, the contracts could all be cleared, and the net balance submitted for payment using a conventional financial mechanism.

16. A mutual credit system.

a. A JLINC network can be formed (see item 11) using a SISA wherein parties agree to extend credit to each other, or to all parties within the network based on some mutually agreed formula to determine credit worthiness.

b. The parties could then engage in commerce together, where debits and credits are created using SISA Events. The actual amounts of the individual transactions could be micro transactions (see item 13), or could be for larger amounts.

c. The network creates mutual credit in a novel way, whereby the participants effectively go into debt with each other to create mutual liquidity.

d. This solution is particularly effective where a network of parties seeks to barter services with each other in a manner that also generates the ability to purchase goods priced in hard currency. By pricing the exchanges in hard currency units and also including non-service based goods in transactions, the network could generate actual liquidity for the combined transactions among all parties.

e. In an extension of that rondel, if the transactions were priced in a unit based on an index of a standard market basket of commodities instead of in one or more hard currencies, the pricing would be stable in the face of fluctuations in fiat money values and any associated global inflation or deflation.

17. A sponsorship-based publishing system with verifiable author and sponsorship provenance.
   a. A sponsor that wishes to be associated with a content producer signs a SISA pledging financial support in exchange for being recognized in some form, text, graphic, audio, visual on the posts containing content and or the home page of the content producer.
   b. The content producer, the sponsor(s) and any associated publisher(s) are identified with a DID, and optionally a VC, and the content is assigned a globally unique identifier.
   c. A chain of provenance accompanies the content, showing the DID of the producer and the DID and VC of each sponsor and publisher or re-publisher in sequence, along with the content's original identifier.
   d. The SISA requires the content producer, the sponsor(s) and each publisher and re-publisher to sign the provenance chain with the private key that can be verified with the signing key indicated by their DID, and to make the chain and signatures available with the article.
   e. Payments can be proportional to the total page number of views accrued by logged in people with verified accounts under the terms of one or more standard contracts.
   f. Payment could also be influenced by the total level of elevation content receives by viewers.
   g. The content posts and/or home page can also include a clickable link that takes the person viewing content to the sponsor's page where the viewer can connect directly with the sponsor, optionally under a SISA.
   h. Where a logged in person does click through to the sponsor, the content producer can receive additional payment under the terms of the SISA(s).
18. A networked variation on the sponsorship-based publishing model
   a. A publication with a separate editorial board can aggregate into a JLINC network a number of different content producers with different sponsors, either on a for-profit, non-profit, or hybrid basis.
   b. The publication is represented by an editorial staff or board that is insulated from direct contact with or influence by the sponsors.
   c. Sponsors can be introduced by an entirely automated system, and/or by separate sales and marketing staff.
   d. Sponsorship is paid under similar standard contacts based on total views, elevation, and/or click through by people who view content.
19. A viewer/consumer funded publishing model with verifiable content producer and publisher provenance
   a. This system operates similarly to the sponsorship-based publishing system, except instead of sponsors the content producers and publishers are supported by the consumers of the content.
   b. People using the system are identified with a DID and their data is protected by SISA. They receive a wallet that is supported by a percentage of total revenue divided by total number of people, and/or total number of person hours consuming content.
   c. Funds from the wallet are disbursed to content producers and/or publishers based on some combination of one or more of the following measures:
      i. Views per person
      ii. Total views
      iii. Total viewing time
      iv. Individual apportionment of the wallet by the choice of viewers
20. A wallet-based variation on the sponsorship-based publishing model
   a. People using the system are identified with a DID and their data is protected by SISA.
   b. The content producer, the sponsor(s) and any associated publisher(s) are identified with a DID, and optionally a VC, and the content is assigned a globally unique identifier. All parties sign an appropriate SISA.
   c. Sponsors pay into a pool whereby viewers agree that their wallet will be credited by sponsors when they visit a sponsor's page and/or view a sponsor's content.
   d. The viewer can then disburse the resulting payment to content producers and publishers based on their own choice, and/or can choose to apportion it based on their own activity based on some combination of one or more of the following automated measures:
      i. Views per person
      ii. Total views
      iii. Total viewing time With reference to FIG. 13, a flow of the present invention is shown.

Figure 13:
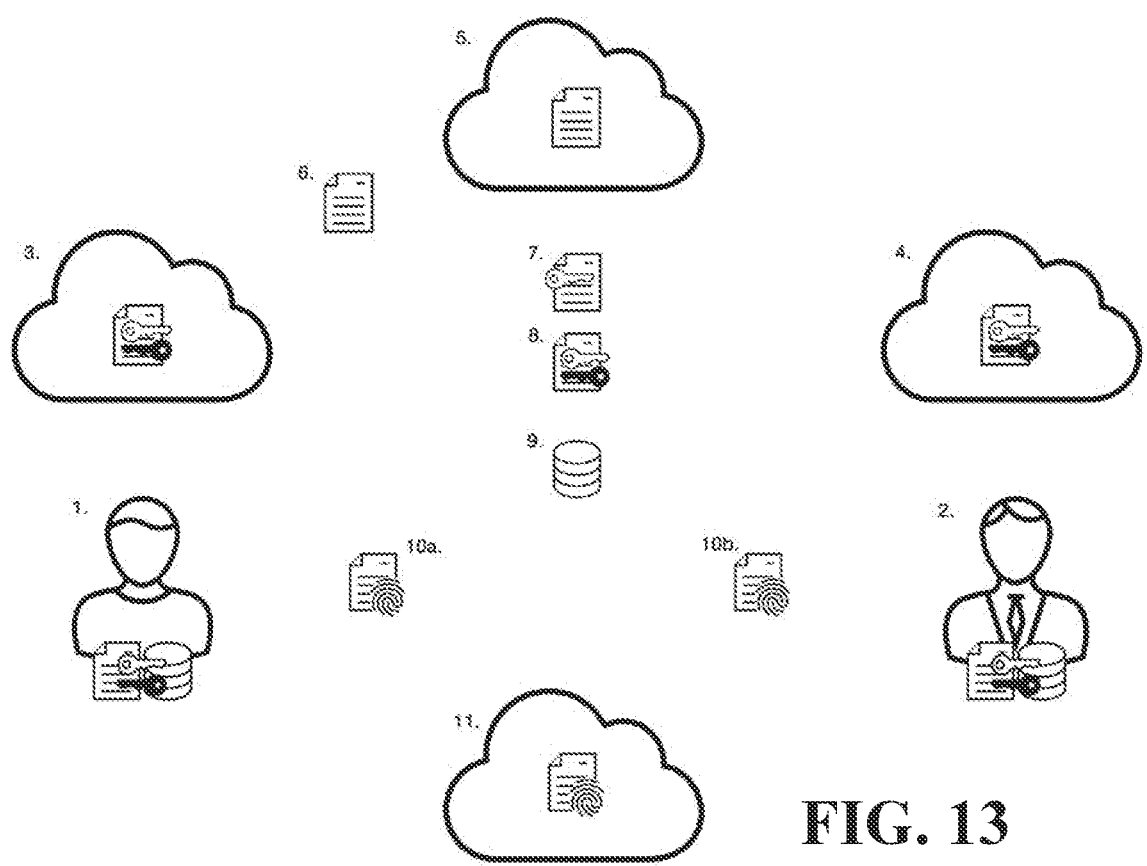
FIG. 13 is a flow of the present invention.

Key for FIG. 13:
1. Party 1
2. Party 2
3. Agent 1
4. Agent 2
5. SISA Service
6. SISA—a standard information sharing agreement
7. SISA signed by Agent 1 for Party 1
8. SISA counter-signed by Agent 2 for Party 2
9. Data transmitted between Parties under SISA terms
10. Signed hash of a completed SISA transaction sent to each party (depicted as 10a sent to Party 1 and 10b sent to Party 2)
11. Audit Record Service It should be understood that the protocol and tech of the system and method of the present invention may be deployed in any situation where there are multiple parties relating to the exchange of data on a permissioned basis.

It should be understood that the devices, systems, and methods described herein may be adapted and configured to function independently or may also interact with other systems or applications, such as for example, a general online sales, auction, or other marketplace. It should also be readily apparent that additional computerized or manual systems may also be employed in accordance with the disclosure in order to achieve its full implementation as a system, apparatus, or method. It will be further understood that various systems, devices, components, and standards can be readily exchanged or substituted for each other where suitable. For example, any open source standard can be adapted and used with the various other components herein where suitable. As another example, HTTPS can be used in place of HTTP wherever that might be appropriate. Other examples will be readily apparent to those of skill in the art.

Those skilled in the art will readily appreciate that any of the systems and methods of the disclosure may include various computer and network related software and hardware, such as programs, operating systems, memory storage devices, data input/output devices, data processors, servers with links to data communication systems, wireless or otherwise, and data transceiving terminals, and may be a standalone device or incorporated in another platform, such as on an existing server, computing device, component or various electronic platforms. In addition, the system of the disclosure may be provided at least in part on a personal computing device, such as a home computer, laptop, or mobile computing device, such as a smart phone, through an online communication connection or connection with the Internet. Those skilled in the art will further appreciate that the exact types of software and hardware used are not vital to the full implementation of the methods of the disclosure so long as players and operators thereof are provided with useful access thereto for the purposes provided herein.

The various aspects, embodiments, implementations or features of the described embodiments can be used separately or in any combination. Various aspects of the described embodiments can be implemented by software, hardware or a combination of hardware and software. Computer readable medium can be any data storage device that can store data which can thereafter be read by a computer system. Examples of computer readable medium include read-only memory, random-access memory, CD-ROMs, DIGITAL VIDEO DISCS or DIGITAL VERSATILE DISCS (either called DVDs), magnetic tape, optical data storage devices, and carrier waves. The computer readable medium can also be distributed over network-coupled computer systems so that the computer readable code is stored and executed in a distributed fashion.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

The foregoing descriptions of specific embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described in order to best explain the principles of the present invention and its practical applications, to thereby enable others skilled in the art to best utilize the present invention and various embodiments with various modifications as are suited to the particular uses contemplated.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

What is claimed is:

1. A link contract system, comprising:
   one or more servers communicatively coupled with two or more communication devices;
   wherein the one or more servers are configured to:
   verify one or more verifiable credentials (VCs) of one of a first party and a second party;
   facilitate communication of a proposed link contract, that includes the one or more VCs, between the parties;
   generate a cryptographic hash of the proposed link contract;
   add cryptographic signatures to the hash from the parties, thereby establishing a cryptographically signed hash which validates a digitally signed link contract with the verifiable credentials (DSLC-VC), wherein the cryptographic signatures are facilitated using private cryptographic keys and are one of generated and verified by computer system agents; and
   provide the cryptographically signed hash to the parties as proof of agreement to the DSLC-VC;
   wherein the DSLC-VC is machine readable and human readable.

2. The system of claim 1, further comprising a computer system agent of one of the parties facilitated by the one or more servers, wherein the computer system agent adds one of the cryptographic signatures to the hash.

3. The system of claim 1, wherein the first party and second party are identified by decentralized identifiers (DIDs), and wherein an exchange of the digital signatures generates or triggers one or more data events which provide non-repudiable audit records proving agreement to terms specified in the DSLC-VC.

4. The system of claim 1, wherein the system provides non-repudiable audit records of one or more subsequent data events occurring under terms of the DSLC-VC.

5. The system of claim 1, wherein the one or more servers govern, under terms of the DSLC-VC, an automated act occurring in response to one or more trigger events.

6. The system of claim 1, further comprising a computer system agent of a verifying party (verifying agent) facilitated by the one or more servers, and a computer system agent of the first party (first agent) facilitated by the one or more servers, wherein the system facilitates verification of an item—the item including one of a state, an attribute, data, sensor data, a document, and documentation—by the verifying agent receiving a decentralized identifier (DID), the first agent presenting a verifiable credential, signed by the first agent, representing the item to the verifying party or verifying agent, the verifying agent verifying the item and a DID of the first party, and the verifying agent countersigning the verifiable credential, the countersigned verifiable credential recorded as a data event by the one or more servers.

7. The system of claim 1, wherein the system facilitates multi-party interactions in which the first party enters the DSLC-VC with the second party, a computer system agent of the second party (second agent) signing with a key referenced by a decentralized identifier (DID), a computer system agent of the first party (first agent) signing the DSLC-VC to create a capability, the second agent transmitting the capability to one or more computer system agents of one or more third parties (one or more third agents), the one or more third agents confirming the existence of the DSLC-VC, and the one or more third agents and second agent executing one or more acts under terms of the DSLC-VC.

8. The system of claim 1, wherein the system records provenance of data relative to one or more third parties, each of the one or more third parties comprising part of a supply chain supplying a product or service to the first party, each of the one or more third parties signing the DSLC-VC.

9. The system of claim 1, wherein the one or more servers govern, under terms of the DSLC-VC, preferences of the first party, related to one of advertising and marketing communications, that are transmitted to the second party and to one or more third parties so that one of advertisements and marketing communications provided to the first party fall within the preferences of the first party.

10. The system of claim 1, wherein the DSLC-VC comprises a financial instrument and wherein the one or more servers are configured to automatically enforce terms of the financial instrument.

11. The system of claim 1, wherein the system facilitates accruing a plurality of digitally signed and auditable data events that are cleared to a separate financial system as a batch.

12. The system of claim 1, wherein the system facilitates a computer system agent acting as a fiduciary agent for secure file storage on behalf of one or more of the parties or a combination of the parties.

13. The system of claim 1, wherein the one or more servers govern, under terms of the DSLC-VC, an exchange of one of a commodity and a trade credit based on the commodity.

14. The system of claim 1, wherein the system facilitates a mutual credit system whereby debits and credits are created using data events associated with the DSLC-VC.

15. The system of claim 1, wherein the system facilitates verified testing by a decentralized identifier (DID) of the first party being provided to a testing device, by the testing device signing a record of test results using a DID of the testing device, and by the testing device sending the signed record to one of a computer system agent of the first party and a computer system agent of a third party.

16. The system of claim 1, wherein the system facilitates verified testing by a decentralized identifier (DID) of the first party being provided using a first of the communication devices, the system receiving through a second of the communication devices a signed record of test results associated with the DID of the first party, and the signed record being sent by the second of the communication devices to one of a computer system agent of the first party and a computer system agent of a third party.

17. A link contract method, comprising:
communicatively coupling one or more servers with two or more communication devices, the two or more communication devices configured to facilitate digital communications between a first party and a second party; and
using the one or more servers:
verifying one or more verifiable credentials (VCs) of one of the first party and the second party;
facilitating communication of a proposed link contract, that includes the one or more VCs, between the parties;
generating a cryptographic hash of the proposed link contract;
adding cryptographic signatures to the hash from the parties, thereby establishing a cryptographically signed hash which validates a digitally signed link contract with the verifiable credentials (DSLC-VC), wherein the cryptographic signatures are facilitated using private cryptographic keys;
providing the cryptographically signed hash to the parties as proof of agreement to the DSLC-VC;
wherein the DSLC-VC is machine readable and human readable.

18. The method of claim 17, wherein the DSLC-VC comprises a legal contract having terms that are automatically enforced using the one or more servers.

19. The method of claim 17, further comprising the one or more servers facilitating verifiable provenance of an online published item by assigning a globally unique identifier to the published item, by identifying a decentralized identifier (DID) associated with an original content producer of the published item, and by identifying a DID associated with each republisher, in sequence, of the published item.

20. The method of claim 19, wherein the one or more servers facilitate sponsorship-based publication and sponsorship identification of the online published item by:
forming the DSLC-VC between a sponsor pledging financial support for the online published item and one of:
the original content producer; and
one or more of the republishers of the online published item;
assigning a DID to, or identifying a DID of, the sponsor; and
one of:
identifying the sponsor together with the online published item; and
providing a link with the online published item, the link navigating to a page identifying the sponsor;
wherein the verifiable provenance facilitates distribution of sponsorship revenue among the original content producer and the one or more republishers.

21. The method of claim 19, wherein the one or more servers facilitate subscription of the online published item by: assigning a DID to, or identifying a DID of, each subscriber of an online platform or system, the online platform or system providing access to the online published item; wherein the verifiable provenance facilitates distribution of subscription revenue, from one or more of the subscribers, to one of the original content producer and one or more of the republishers.

22. The method of claim 19, wherein the one or more servers facilitate consumer-based payments and sponsorship by: assigning a DID to, or identifying a DID of, each consumer user of an online platform or system, the online platform or system providing access to a plurality of online published items; facilitating one or more DSLC-VCs between the consumer users and a plurality of sponsors; facilitating payment, from one of a sponsor and a pool funded at least in part by the sponsor, to a digital wallet of one of the consumer users in response to the consumer user viewing content of the sponsor; and facilitating payment from the digital wallet to one of a content producer and a republisher of one of the online published items in response to input preferences of the consumer user.

23. The method of claim 17, wherein the one or more servers govern confidentiality of participants in an online group under terms of the DSLC-VC, the method further comprising the one or more servers generating a decentralized identifier (DID) for each participant and facilitating each participant sharing information and engaging in the group pseudonymously using its DID.

24. The method of claim 23, further comprising the one or more servers facilitating the formation of networks of online groups on an online platform or system, each network including a plurality of online groups, each online group having a DID assigned to it, the method further comprising the one or more servers managing a plurality of DSLC-VCs between and among the online groups and the networks, and facilitating each online group belonging to one or more networks.

25. The method of claim 17, further comprising facilitating voting or polling without revealing any personally identifiable information (PII) by: one or more computer system agents creating a voting or polling decentralized identifier (DID) for the first party; the one or more computer system agents creating one or more cryptographic hashes of attributes by which the first party is authenticated; and using these hashes as unique identifiers for the purpose of voting or polling.

26. The method of claim 17, further comprising transmitting a copy of the DSLC-VC to an audit service for recordation.

27. A link contract method, comprising:
  communicatively coupling one or more servers with two or more communication devices, the two or more communication devices configured to facilitate digital communications between a first party and a second party; and
  using the one or more servers:
    verifying one or more verifiable credentials (VCs) of one of the first party and the second party;
    facilitating communication of a proposed link contract, that includes the one or more VCs, between computer system agents of the parties;
    generating a cryptographic hash of the proposed link contract;
    adding cryptographic signatures to the hash from the parties, thereby establishing a cryptographically signed hash which validates a digitally signed link contract with the verifiable credentials (DSLC-VC), wherein the cryptographic signatures are facilitated using private cryptographic keys;
    providing the cryptographically signed hash to the parties as proof of agreement to the DSLC-VC; and
    each computer system agent creating one or more entries using one or more decentralized identifiers (DIDs) pointing to a public key of a key pair;
  wherein the DSLC-VC is machine readable and human readable.

* * * * *